US012400451B1

(12) United States Patent
Battista et al.

(10) Patent No.: US 12,400,451 B1
(45) Date of Patent: Aug. 26, 2025

(54) GENERATING ACTIONABLE METRICS FROM SENSOR DATA

(71) Applicant: Amazon Technologies, Inc., Seattle, WA (US)

(72) Inventors: Anthony Joseph Battista, Seattle, WA (US); Jason O'Brien Hawkes, North Bend, WA (US); Katherine Elizabeth Sbordon, Seattle, WA (US); Guillermo Bravo Beneitez, Seattle, WA (US); Jennifer S. Hwang, Seattle, WA (US); Rico Polim, Seattle, WA (US); Hoda Parvin, Seattle, WA (US); Kenil Vora, Bellevue, WA (US); Kelly Michelle Lohr, Bellevue, WA (US); Chaitanya Sankuratri, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 17/119,296

(22) Filed: Dec. 11, 2020

(51) Int. Cl.
*G06V 20/52* (2022.01)
*G06N 20/00* (2019.01)
*G06Q 30/0201* (2023.01)
*G06T 7/70* (2017.01)
*G06V 40/10* (2022.01)
(Continued)

(52) U.S. Cl.
CPC .............. *G06V 20/52* (2022.01); *G06N 20/00* (2019.01); *G06Q 30/0201* (2013.01); *G06T 7/70* (2017.01); *G06V 40/10* (2022.01); *G06V 40/20* (2022.01); *G06T 2207/30196* (2013.01); *G06T 2207/30242* (2013.01); *H04N 7/00* (2013.01)

(58) Field of Classification Search
CPC . G06T 2207/30232; G06T 2207/30196; G06T 2207/30242; G06T 2200/24; G06V 20/52; G06V 20/53; G06V 40/103; G06V 20/44; G06Q 30/0201; G06Q 30/0246
See application file for complete search history.

(56) References Cited

U.S. PATENT DOCUMENTS 6,334,110 B1 * 12/2001 Walter .................... G06Q 30/02
705/14.66
8,380,558 B1 * 2/2013 Sharma ................... G06Q 30/02
348/69
(Continued)

FOREIGN PATENT DOCUMENTS

JP 4728229 B2 * 7/2011 ............. G06Q 30/02
WO WO-2013009721 A1 * 1/2013 ........ G06F 17/30241

*Primary Examiner* — Gandhi Thirugnanam
(74) *Attorney, Agent, or Firm* — Athorus, PLLC

(57) ABSTRACT

This disclosure is directed to systems and techniques for generating actionable metrics data based on sensor data generated from one or more sensors within an environment. For instance, a brick-and-mortar retail environment or other materials handling facility may include one or more sensors, such as overhead cameras, which generate image data as users interact with items in the environment. Machine-learning models and/or computer-vision algorithms may then analyze the resulting image data to identify the interactions between the users and the items. The system may then generate metrics data indicating varying metrics associated with these interactions, which may be used to generate graphical user interfaces (GUI) for presenting the metrics data to vendors, brand owners, and the like.

20 Claims, 10 Drawing Sheets

(51) Int. Cl.
*G06V 40/20* (2022.01)
*H04N 7/00* (2011.01)

(56) References Cited

U.S. PATENT DOCUMENTS

| | | | | |
|---|---|---|---|---|
| 8,412,656 | B1 * | 4/2013 | Baboo | G06Q 30/06 |
| | | | | 706/20 |
| 8,577,705 | B1 * | 11/2013 | Baboo | G06Q 30/02 |
| | | | | 705/7.42 |
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 10,127,438 | B1 | 11/2018 | Fisher et al. | |
| 10,133,933 | B1 | 11/2018 | Fisher et al. | |
| 10,262,331 | B1 * | 4/2019 | Sharma | H04W 4/029 |
| 10,339,385 | B1 * | 7/2019 | Truong | H04W 4/35 |
| 10,402,837 | B2 * | 9/2019 | Eswaran | G06Q 30/0204 |
| 10,614,474 | B2 * | 4/2020 | Poole | G06Q 10/087 |
| 10,813,477 | B2 * | 10/2020 | Kobayashi | G06Q 30/06 |
| 11,151,584 | B1 * | 10/2021 | Sharma | G06V 40/174 |
| 11,226,688 | B1 * | 1/2022 | Glaser | G06Q 30/0633 |
| 11,250,376 | B2 * | 2/2022 | Fisher | G06N 3/08 |
| 11,615,430 | B1 * | 3/2023 | Sharma | G06Q 30/0201 |
| | | | | 705/7.29 |
| 2006/0149628 | A1 * | 7/2006 | Chefalas | G06Q 30/0216 |
| | | | | 705/14.18 |
| 2009/0164284 | A1 * | 6/2009 | Koiso | G06Q 10/00 |
| | | | | 705/7.29 |
| 2010/0063870 | A1 * | 3/2010 | Anderson | G06Q 30/0246 |
| | | | | 705/7.29 |
| 2013/0284806 | A1 | 10/2013 | Margalit | |
| 2016/0300049 | A1 * | 10/2016 | Guedalia | G06V 30/1985 |
| 2017/0017998 | A1 * | 1/2017 | Dhawan | G06Q 30/0271 |
| 2018/0130078 | A1 * | 5/2018 | Jones | G06Q 30/0639 |
| 2019/0188734 | A1 * | 6/2019 | Nagai | G06Q 30/0201 |
| 2021/0133787 | A1 * | 5/2021 | Chen | G06V 20/53 |
| 2021/0241214 | A1 * | 8/2021 | Bogolea | G06Q 30/0248 |
| 2023/0156158 | A1 * | 5/2023 | Moyne | H04N 23/60 |
| | | | | 348/159 |
| 2023/0160740 | A1 * | 5/2023 | Wu | G06T 7/194 |
| | | | | 702/173 |

* cited by examiner

GENERATING ACTIONABLE METRICS FROM SENSOR DATA

BACKGROUND

Retailers, wholesalers, and other product distributors typically maintain an inventory of various items that may be ordered, purchased, leased, borrowed, rented, viewed, and so forth, by clients or customers. In some instances, these customers shop online via e-commerce websites, while in other instances the customers shop in brick-and-mortar retail establishments. In the former instances, the retailers may use online actions of the customers, such as which items they view before making a purchase, for providing a better experiences for their customers. In the latter instances, meanwhile, brick-and-mortar establishments often rely on customer surveys or the like for gathering data to increase the quality of customer experiences. However, customer-reported data may differ from actual customer behavior in some instances.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
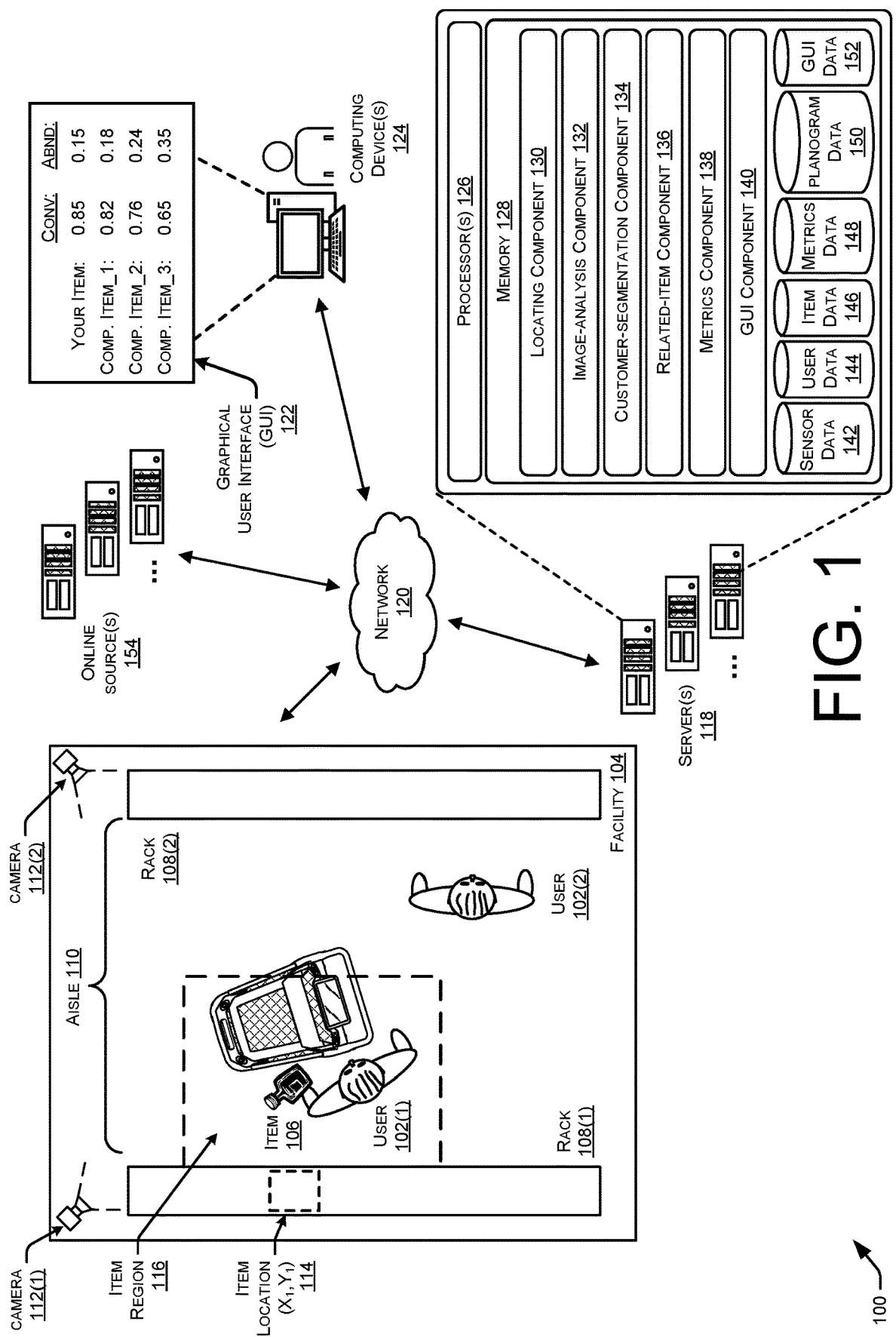
FIG. 1 illustrates an example architecture in which one or more server computing devices use sensor data, such as image data, generated within a facility to generate metrics data that may be used to increase a customer experience in the facility or at other facilities. In this example, the servers may analyze image data of users as they interact with one or more items within the facility for generating metrics data such as an amount of time that users typically spend in front of respective items, an amount of users that acquire respective items after picking them up, and the like. The servers may use this data to generate graphical user interfaces (GUIs) for presentation to users associated with the respective items.

This disclosure is directed to systems and techniques for generating actionable metrics data based on sensor data generated from one or more sensors within an environment. For instance, a brick-and-mortar retail environment or other materials handling facility may include one or more sensors, such as overhead cameras, in-shelf weight sensors, or the like, which may be configured to generate sensor data as users interact with items in the environment. Machine-learning models and/or computer-vision algorithms of a system may then analyze the resulting sensor data (e.g., image data) to identify the interactions between the users and the items. For instance, image data generated by one or more cameras may be analyzed by the system to identify users picking up items from shelves and placing them in a cart or basket, picking up the items and returning them to the shelves, walking past items, remaining in front of items for a certain amount of time, and/or the like.

In some instances, the system may additionally store planogram data indicating respective locations within the environment corresponding to respective items available in an item catalog. For example, the planogram data may indicate that items associated with a first item identifier are associated with a first location within the environment, items associated with a second item identifier are associated with a second location in the environment, and so forth. These locations may be specified in (X, Y) coordinates, (X, Y, Z) coordinates, bounding-box coordinates, or in any other manner. In addition, the system may be configured with configuration data indicating the locations of the sensors (e.g., the cameras) within the environment such that the system is able to identify the respective item locations within the image data generated by cameras in the environment, for instance. Using the planogram data, the environment data, and the configuration data, the system may be configured to identify interactions between users and instances of items associated with particular item identifiers.

For example, using the information described above, the machine-learning models and/or computer-vision algorithms may be configured to determine when a user picks up an instance of an item associated with a particular item identifier, such as a particular can of soda. In addition, the system may be configured to determine when users travel past item locations associated with respective item identifiers (e.g., within a predefined distance of the respective locations), an amount of time users dwell in front of the item locations, and/or the like.

In some instances, the system may also include a locating component that is configured to identify a user and associate a user identifier to a user entering an environment, as well as to continually or periodically determine a current location of the unique user identifier. For example, when a first user enters the environment, the system may determine an identifier of the user, such as in response to the user scanning a unique barcode or other visual indicia at a scanning device positioned at an entry of the environment. The system may then analyze the image data or other sensor data to determine the location of the user identifier as the corresponding user moves within the user environment. The system may then use this information to determine which users walk past which items, which users pick up which items, and so forth. It is to be appreciated that the system may only determine and maintain the location of the assigned user identifiers based on express consent of the users and, further, it is to be appreciated that the system may assign, and maintain locations of, user identifier that do not expressly include personally identifying information.

After identifying these different types of interactions between users and items, as well as potentially identifying which users are associated with the interactions, a metrics component of the system may generate one or more metrics regarding individual item identifiers available within the item catalog. For example, the metrics component may be configured to generate some or all of the following types of metrics:

- a volume of user traffic within a predefined distance of an item location (e.g., an amount of users that have passed within the predefined distance) for a predefined period of time;
- an average, median, or other amount of time that users spent within a predefined distance of an item location within a predefined amount of time;
- a change in the average, median, or other amount of time that users spent within a predefined distance of an item location between a first time range and a second time range;
- how often users acquire an instance of an item associated with an item identifier after picking up an instance of the item;
- how often users do not acquire an instance of an item associated with an item identifier after picking up an instance of the item;
- a change in how often users acquire an instance of an item associated with an item identifier after picking up an instance of the item between a first time range and a second time range;
- a change in how often users do not acquire an instance of an item associated with an item identifier after picking up an instance of the item between a first time range and a second time range;
- how often users acquire an instance of an item associated with a first item identifier after picking up and setting down an instance of an item associated with a second item identifier;
- which items users acquire after setting down an instance of an item associated with a particular item identifier;
- a change in how often users acquire an instance of an item associated with a first item identifier after picking up and setting down an instance of an item associated with a second item identifier between a first time range and a second time range;
- how often users acquire instances of an item associated with an item identifier from an online source after visiting a brick-and-mortar establishment;
- a change, between a first and a second time range, in how often users acquire instances of an item associated with an item identifier from an online source after visiting a brick-and-mortar establishment;
- how often users acquire instances of an item associated with an item identifier from an online source after picking up an instance of an item associated with the item identifier in a brick-and-mortar establishment;
- a change, between a first and a second time range, in how often users acquire instances of an item associated with an item identifier from an online source after picking up an instance of an item associated with the item identifier in a brick-and-mortar establishment;
- how often users made comparisons between an instance of an item associated with a first item identifier and an instance of an item associated with a second item identifier;
- which items users often compared to one another;
- a change in how often users made comparisons between an instance of an item associated with a first item identifier and an instance of an item associated with a second item identifier between a first time period and a second time period;
- an amount of users within an environment that have been within the environment or acquired an item from the environment within a threshold amount of time;
- an amount of users within an environment that are new to the environment or have not visited or acquired an item from the environment within a threshold amount of time;
- an amount of revenue from returning users;
- an amount of revenue from new users within the environment;
- a change in revenue from returning users between a first time range and a second time range;
- a change in revenue from new users between a first time range and a second time range;
- an amount of users that acquired an instance of an item associated with an item identifier that had received an advertisement associated with the item identifier within a threshold amount of time;
- an amount of users that acquired an instance of an item associated with an item identifier that had not received an advertisement associated with the item identifier within a threshold amount of time;
- a change, between a first time range and a second time range, between an amount of users that acquired an instance of an item associated with an item identifier that had received an advertisement associated with the item identifier within a threshold amount of time;
- a change, between a first time range and a second time range, between an amount of users that acquired an instance of an item associated with an item identifier that had received an advertisement associated with the item identifier within a threshold amount of time;
- an amount of users that acquired an instance of an item associated with an item identifier that had received a sample of the item within a threshold amount of time;
- a change, between a first time range and a second time range, between an amount of users that acquired an instance of an item associated with an item identifier that had received a sample of the item within a threshold amount of time;
- an amount of users that acquired an instance of an item associated with an item identifier that had not received a sample of the item within a threshold amount of time;
- a change, between a first time range and a second time range, between an amount of users that acquired an instance of an item associated with an item identifier that had not received a sample of the item within a threshold amount of time; and/or
- any other similar or different metrics, or changes in the metrics between two or more time ranges.

After identifying one or more of these metrics, a graphical-user-interface (GUI) component of the system may generate GUI data for presenting the metrics data to one or more users. For example, the GUI component may generate GUI data that includes metrics data associated with a particular item identifier and may send this GUI data to a computing device operated by a user that is associated with the particular item identifier, such as a vendor that offers instances of items associated with the item identifier. In some instances, the GUI component may generate GUI data that includes metrics related to multiple item identifiers associated with a common vendor, a common brand, or the like.

To provide an example, a vendor that offers a particular can of soda may operate a computing device to send, to the system, a request for metrics data related to the particular can of soda. In response, the GUI component may generate GUI data that includes metrics for the particular can of soda as determined by user interactions with instances of the can of soda at a particular brick-and-mortar establishment, at multiple brick-and-mortar establishments, and/or the like. The GUI component may then send the GUI data to the computing device for presentation to the vendor.

The GUI data presented on the display of the computing device may include any sort of metrics data, such as the example metrics data listed above. For example, the GUI data may indicate an amount of users that passed within a predefined distance of the instances of the can of soda in the environment, an amount of users that physically picked up the can of soda, an amount of users that acquired a can of soda after picking it up, an amount of users that did not acquire a can of soda after picking it up, an amount of users that acquired a different can of soda (and the identifies of these different cans of soda) after picking up and replacing the can of soda, and/or the like. Using this metrics data, the vendor may be able to generate actionable insights, such as how the item of the vendor performs relative to other items, how often users acquire an item after picking up the item, how often users abandon the item after picking up the item, and so forth. Further, these metrics enable the vendor see how certain metrics change over time, thus allowing the vendor to see the effects of new item packing, new item placement within the environment, and so forth.

In addition, the presenting metrics regarding the item identifier(s) offered by the merchant, the system may be further configured to determine which item identifiers are most related to a particular item identifier of the vendor and generate and present this metrics data as well. For instance, the system may determine which items are related to (e.g., are the competitors of) the example can of soda. In response to vendor requesting metrics data associated with the can of soda, the system may identify the competitor product, generate metrics data associated with these competitor products, and send GUI data to the computing device of the vendor that includes metrics data of the item of the vendor and the metrics data of the competitor item. The vendor is thus able to easily view how the item identifier of the vendor fares relative to the competitor items.

The system may determine items that are competitor items for a given item in any number of ways. For example, the system may determine, for a particular item, which other items users often consider or purchase and may use this information in determining competitor items. In addition, or in the alternative, the system may analyze physical dimensions of items in determining competitor items. For instance, items having a similar shape and/or size to one another may be deemed more similar and, thus, more likely to be competitor items than items that are dissimilar in shapes and/or sizes. In still other instances, the system, the may determine attributes that are associated with a particular item, and may determine which other items are also strongly associated with these attributes. These latter items may then be deemed competitor items of the particular item. Furthermore, in some instances, the system may use this analysis on a region-by-region basis. For example, if a set of attributes are determined to be important for users in a first region but not in a second region, then those attributes may be used to determine competitor items for a particular item in the first region, but not for the determining competitor items for the same particular item in the second region. The system may additionally or alternatively utilize other data when determining competitor items, such as weights of the items, categories of the items, and/or the like.

In some instances, the system may further be configured to indicate correlations between item conversion or abandonment rates and respective metrics. For instance, the system may generate metrics data indicating how rates of conversion relate to certain metrics such as an amount of users that pass by a particular item, an average length of time that users spend in front of a particular item, and so forth. For instance, the system may determine whether a conversion rate increases or decreases based on increased traffic in front of an item and may present this information to a vendor, brand owner, or the like. Further, the system may generate recommendations using this data, such as a recommendation to place a particular item in a location with higher traffic, less traffic, or the like.

In addition to generating the metrics data described above, a customer-segmentation component of the system may be configured to generate data associated with users in the environment to enable the vendor to filter the metrics data based on different user characteristics. That is, given that users may be identified within the environment, information stored in respective user profiles may be used to determine user data, in addition to information regarding the current shopping trip of each respective user. This user data may then be used to generate different user segments, such that a vendor or other user viewing the GUI data may generate different view of the metrics data according to the different user segments. For example, the customer-segmentation component may be configured to generate user data that may be used to generate user segments such as the following;

Users that are the "best" customer for a particular item identifier, brand, or the like, based on purchase histories of the users;

Users that have acquired an instance of an item associated with a particular item identifier or brand with a threshold frequency;

Users that have acquired an instance of an item associated with a particular item identifier or brand within a threshold recency;

Users that have acquired a threshold amount or monetary amount of an item associated with a particular item identifier or brand;

User that have shopped for or acquired items online within a threshold amount of time;

Users that have shopped for or acquired items at a brick-and-mortar retail establishment within a threshold amount of time;

Users that have shopped for or acquired items both online and at a brick-and-mortar retail establishment within a threshold amount of time;

Users that are members of a particular group;

Users that are not members of a particular group;

Users that shop at a certain time of day (e.g., morning, afternoon, evening, night, etc.);

Users that shop for a length of time that is within a defined time range (e.g., less than ten minutes, between ten and thirty minutes, etc.);

Users that stay in front of an item location associated with an item identifier of the vendor for a threshold amount of time; and/or any other similar or different customer segments.

Continuing the example of the can of soda from above, for instance, the GUI data sent to the computing device of the vendor may enable the vendor to view different metrics regarding the can of soda within the different customer segments. For example, the GUI may enable the vendor view a difference between a conversion rate of the can of soda for morning customers versus a conversion rate for evening customers. In another example, the vendor may be able to see how an item performs to the "best" customers of a brand versus new customers to the brand. Of course, while a few examples are given, it is to be appreciated that the GUI data may be viewed according to any other similar or different customer segmentation.

It is to be appreciated that any customer segmentation described herein may be performed with reference to groups of individuals and without any personally identifiable information. That is, any metrics data and other data presented to vendors, brand owners, and the like may be presented in a genericized fashion and without any reference to individual or uniquely identified customers. Further, and as noted throughout, information regarding individual customers, which is used only when anonymized and aggregated with other customers in a group, may only be included after express opt-in by the respective user. In short, customer data may only be used when a customer expressly consents and requests to its use and, then, the data may only be used in an anonymous and aggregated manner. Further, group data may only be presented for multiple customers and not for a single customer or small groups of customers.

In addition to generating GUI data that presents metrics data associated with a particular item identifier or brand, the system may further generate and present metrics data using data other than an item identifier or brand as a key. For example, the system may generate and present GUI data indicating the item identifiers within the environment that receive the most or least traffic, the item identifiers that users stay in front of the longest, item identifiers that the users abandon the most or the least, item identifiers or categories of items that users most often substitute one item for another, areas of the environment where users spend the most or least time, areas of the environment where customers of a particular item identifier or brand spend the most or least time, and/or the like. In some instances, the system may generate a GUI that presents top-N lists of this information, such as the ten item identifiers within the environment having a highest or lowest conversion rate.

In still other examples, the system may generate GUI data that indicates a path of a user through the environment as depicted by items picked up and/or acquired by the user and the order and timing of these interactions. For instance, for a user that acquired an item associated with a particular item identifier, a vendor or other user associated with the item identifier may request and view a GUI indicating which items the user picked up, abandoned, and acquired during the corresponding shopping session. In addition, the system may generate GUI data indicating which items users often acquire together, which items are most unlikely to be acquired by a same user, and/or the like.

As introduced above and described in detail below, this disclosure describes systems and techniques to generate metrics data based on analyzing sensor data representing real-world, physical interactions between users and items in an environment. By analyzing the sensor data directly, the resulting metrics data comprises an accurate depiction of the interactions, which enables vendors, brand owners, and the like to generate actionable insights to improve conversion of their items in the environment and increase user satisfaction. Further, given that the system generates data regarding the users that are interacting with the items in the environment, the generated metrics data may viewable according to an array of different criteria, such as different customer segments and/or the like. It is to be appreciated that while example metrics, customer segments, and the like are described, these merely represent examples and any other types of metrics, customer segments, and the like may be utilized in other instances.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement the techniques described herein. As illustrated, the architecture 100 includes example users 102(1) and 102(2) engaging in respective shopping sessions within a facility 104, such as a brick-and-mortar retail establishment. As illustrated, the facility 104 may include items, such as illustrated item 106(1), residing on respective racks, such as example racks 108(1) and 108(2). These racks 108(1)-(2) may define an aisle in which the users 102(1)-(2) are able to navigate during their shopping sessions. It is to be appreciated that while FIG. 1 depicts the facility 104 as a brick-and-mortar retail establishment, the techniques may apply equally in other environments, such as users acquiring books from a library, associates working within a warehouse, and/or the like.

In addition, the facility 104 may be configured with one or more sensors for generating sensor data indicative of interactions between the users in the facility and the items housed therein. The sensors may comprise overhead cameras, in-shelf cameras, in-shelf weight sensors, and/or any other type of sensor for generating corresponding sensor data. In the illustrated example, the facility 104 includes one or more cameras 112(1) and 112(2) configured to generate image data. In this example, the illustrated cameras 112(1)-(2) are associated with a field-of-view (FOV) that includes at least a portion of the racks 108(1)-(2) and the aisle 110. Thus, the image data generated by the cameras 112(1)-(2) may include interactions between the illustrated used 102 (1)-(2) and at least some of the items on the racks 108(1)-(2).

In one example, the image data generated by one or both of the cameras 112(1)-(2) may depict the user 102(1) interacting with the example item 106(1) by picking up the item 106(1) from an item location 114 associated with the item 106(1). For instance, the facility 104 may be associated with a planogram, which indicates which items are associated with which respective locations in the facility 104, such as the example item 106(1) being associated with the item location 114. In addition, an item region 116 may be defined around the item location 114 for determining when users, such as the user 102(1) are potentially engaging in interactions with the item 106(1), as discussed in further detail below.

As illustrated, the architecture 100 may further include a system comprising one or more servers 118 that are configured to analyze the sensor data generated within the facility, such as the image data generated by the cameras, to identify interactions between the users in the facility 104 and the items in the facility 104. These interactions may be used to determine when users acquire items and/or return items for maintaining a respective virtual cart of items associated with each user. In some instances, these virtual carts may be maintained to enable the user to "just walk out" of the facility 104 after completing their respective shopping session, at which point the servers 118 may charge a prestored payment instrument associated with a respective user for a cost of the items in their respective virtual cart.

In addition, the servers 118 may use the interactions between the users and the items in the facility to generate metrics data and/or actionable insights regarding the behavior of users within the facility. For example, the servers 118 may generate metrics data that includes certain metrics associated with individual items, groups of item (e.g., items of a same brand), individual users, groups of users, and/or the like. This metrics data may then presented in one or more graphical user interfaces (GUIs) and presented to different types of users, such as vendors, brand owners, and the like. These users may use this information to determine how to increase customer satisfaction, how to increase conversion of one or more products, and/or the like. For example, this type of data may enable the users to change certain characteristics associated with the items in the facility 104, such as the packaging or the location of the items, and determine if an how the metrics associated with the items change in response.

Figure 3:
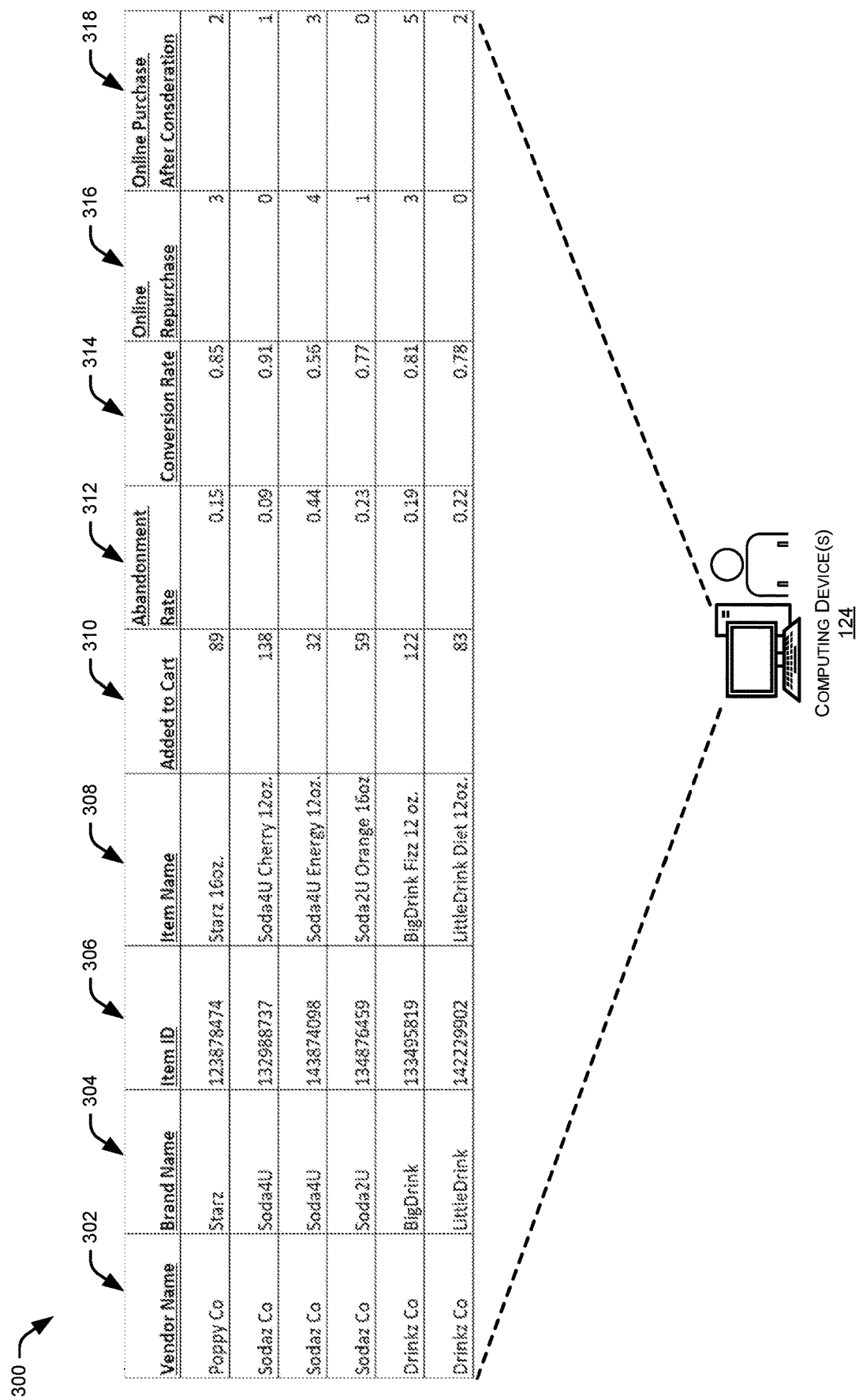
FIG. 3 illustrates an example GUI that the servers of FIG. 1 may generate and present on a computing device of a user associated with one or more items in the facility. As illustrated, the GUI may present metrics data associated with an item associated with the user, as well as metrics data associated with items that have been deemed to be competitor items.

As illustrated, the servers 118 may couple to devices and sensors in the facility 104 via one or more networks 120, which may represent one or a combination of wired and/or wireless networks. In some instances, the servers 118 may reside in the facility, while in other instances the servers 118 may reside remote from the facility. In still other instances, some of the functionality of the servers 118 may reside in the facility 104, while other functionality may reside at a remote location. In addition, the servers 118 may couple, via the network 120, to one or more computing devices 124, such as computing devices 124 associated with vendors or brand owners that offer items in the facility 104. After generating GUI data that includes the metrics data described herein, the servers 118 may send the GUI data to one or more of the devices for presenting a GUI on the respective device. FIG. 1, for instance, illustrates that the servers 118 have presented, on the example computing device 124, an example GUI 122 that indicates a conversion rate and an abandonment rate of an item associated with a user of the computing device 124 versus respective conversion and abandonment rates of competitor items. FIG. 3 and a corresponding discussion illustrate and describe example GUIs in further detail.

In order to generate the underlying data associated with the GUI 122, the servers 118 may include one or more processors 126 and memory 128, which may store an array of components for performing some or all of the techniques described herein. For instance, the memory 128 may store a locating component 130, an image-analysis component 132, a customer-segmentation component 134, a related-item component 136, a metrics component 138, and a GUI component 140. In addition, the memory 128 may include one or more datastores storing sensor data 142, user data 144, item data 146, metrics data 148, planogram data 150, and GUI data 152. In addition, the servers 118 may include additional components, such of which are illustrated in, and described below with reference to, FIG. 8.

The locating component 130 may function to continually or periodically determine respective locations of user identifiers within the facility. For example, the locating component 130 or another component of the system may determine a user identifier associated with a user upon the user entering the facility 104. For example, the facility may include an entry gate that includes a scanner or other device that entering users may utilize to scan a code on their respective mobile phones to indicate to the system that they are entering the facility 104. Thereafter, the locating component 130 may associate an identifier associated with the user and may use sensor data, such as the image data generated by the cameras 112, to determine the location of the user identifier in the facility 104. The locating component may store this information in the user data 144 or otherwise. Further, while this example describes the users scanning identifiers at an entry gate, it is to be appreciated that the locating component 130 may identify respective users via biometric information (e.g., scanning a palm), voice recognition, username/password, or in any other manner in which the users explicitly consent to and request to be identified by the system. Further, it is to be appreciated that the locating component 130 may store the location of user identifiers, with these user identifiers being free from information that expressly indicates the underlying identity of each respective user.

The image-analysis component 132 may be configured to analyze the image data, stored within the sensor-data datastore 142, to identify interactions between the users and the item in the facility 104. For example, the image-analysis component 132 may analyze the image data generated by the cameras 112 to identify the user 102(1) entering the item region 116, staying in the item region 116 for a certain amount of time, picking up the instance of the image 106, placing the item 106 in the cart of the user, putting the item 106 back on the rack 108(1), and/or the like. In some instances, the image-analysis component 132 may use one or more trained machine-learning models and/or computer-vision algorithms to identify these interactions. Further, the interactions identified by the image-analysis component 132 may be used to update respective virtual carts of the users and/or may be used to identify metrics associated with the items, as described below with reference to the metrics component 138.

In some instances, in addition to analyzing the image data to identify the actions of users within the facility 104, the image-analysis component 132 may use additional data to determine details of the actions, such as the users and/or items involved. For example, the image-analysis may determine, from the planogram data, that a particular item is associated with a particular location represented within the image data and, thus, may determine that this interactions involves the particular item. In addition, or in the alternative, the image-analysis component 132 may determine, from the user data 144, that a particular user identifier is currently located at or near the same location and, thus, may determine that the interaction represented in the image data is to be associated with the particular user identifier.

To provide an example, envision that the image data generated by the cameras 112(1) and/or 112(2) represents the user 102(1) picking up the item 106 from the item location 114. The image-analysis component 132 may determine, from the planogram data 150, that the item location 114 is associated with an item identifier corresponding to a bottle of ketchup. Thus, the image-analysis component 132 may determine that the interaction comprises the user 102(1) picking up a particular bottle of ketchup indicated as being associated with the item location 114 by the planogram data 150. Further, the image-analysis component 132 may determine, from the user data, that a particular user identifier is represented in the image data (e.g., because the user identifier is associated with a current location of the user in the image data). Thus, the image-analysis component 132 may determine that the user identifier is associated with the interaction of picking up the particular bottle of ketchup.

The customer-segmentation component 134, meanwhile, may determine, from the user data 144, different segments or groups of customers. For example, the customer-segmentation component 134 may be configured to receive one or more criteria and identify which users satisfy the criteria and, thus, form the customer segment represented by the criteria. For example, the customer-segmentation component 134 may be configured to identify, for a particular item or brand, those users that frequently acquire an item or items of a brand, those users that have recently acquired an item or items of a brand, those users that have acquired a certain amount of an item or items of a brand, or the like. In addition, or in the alternative, the customer-segmentation component 134 may identify those users that shop during a certain time range (e.g., morning, afternoon, evening, night, etc.), those users that shop for a certain length of time, those users that stay in front of an item for a threshold amount of time, and/or the like. While a few example customer segments are described, it is to be appreciated that the customer-segmentation component 134 may identify any other similar or different segment of users based on any sort of specified criteria. For example, the customer-segmentation component 134 may identify any one or more of the following example user segments, based on the user data 144 and/or otherwise;

- Users that are the "best" customer for a particular item identifier, brand, or the like, based on purchase histories of the users;
- Users that have acquired an instance of an item associated with a particular item identifier or brand with a threshold frequency;
- Users that have acquired an instance of an item associated with a particular item identifier or brand within a threshold recency;
- Users that have acquired a threshold amount or monetary amount of an item associated with a particular item identifier or brand;
- User that have shopped for or acquired items online within a threshold amount of time;
- Users that have shopped for or acquired items at a brick-and-mortar retail establishment within a threshold amount of time;
- Users that have shopped for or acquired items both online and at a brick-and-mortar retail establishment within a threshold amount of time;
- Users that are members of a particular group;
- Users that are not members of a particular group;
- Users that shop at a certain time of day (e.g., morning, afternoon, evening, night, etc.);
- Users that shop for a length of time that is within a defined time range (e.g., less than ten minutes, between ten and thirty minutes, etc.);
- Users that stay in front of an item location associated with an item identifier of the vendor for a threshold amount of time; and/or
- any other similar or different customer segments.

The related-item component 136, meanwhile, may function to identify which items are competitors with respect to one or more specified items. For instance, the related-item component 136 may determine, for each of multiple items, which other items in an item catalog are competitors of the specified item. In some instances, the related-item component 136 may analyze the item data 144 to make this determination. For example, the related-item component 136 may determine that items are competitor items to one another based on the items often being purchased together, based on users often comparing these items, based on users often picking up one such item before replacing it and choosing another particular item, and so forth. In some instances, the related-item component 136 may additionally or alternatively analyze the item data 144 to compare characteristics associated with the items for determining whether two or more items are competitor items or are otherwise related. For example, the related-item component 136 may compare item ingredients, item advertising, the shape and/or size of items, and so forth. Of course, while a few examples are provided, the related-item component 136 may determine that certain items are related to one another in any other manner. Further, and as described below, the related-item component 136 may identify related items for determining which metrics data to present on the generated GUIs, such as the example GUI 122.

Next, the metrics component 138 may be configured to generate and store metrics data 148 associated with item(s), user(s), and/or the like based at least in part on the interactions identified by the image-analysis component 132. For example, the metrics component may be configured to identify an array of metrics associated with items, such as any one or more of the following;

- an amount of users that have passed within a predefined distance (e.g., within the item region 116) of an item location for a predefined period of time;
- an average, median, or other amount of time that users spent within a predefined distance (e.g., the item region 116) of an item location within a predefined amount of time;
- a change in the average, median, or other amount of time that users spent within a predefined distance of an item location between a first time range and a second time range;
- how often users acquire an instance of an item associated with an item identifier after picking up an instance of the item;
- how often users do not acquire an instance of an item associated with an item identifier after picking up an instance of the item;

a change in how often users acquire an instance of an item associated with an item identifier after picking up an instance of the item between a first time range and a second time range;

a change in how often users do not acquire an instance of an item associated with an item identifier after picking up an instance of the item between a first time range and a second time range;

how often users acquire an instance of an item associated with a first item identifier after picking up and setting down an instance of an item associated with a second item identifier;

which items users acquire after setting down an instance of an item associated with a particular item identifier;

a change in how often users acquire an instance of an item associated with a first item identifier after picking up and setting down an instance of an item associated with a second item identifier between a first time range and a second time range;

how often users acquire instances of an item associated with an item identifier from an online source after visiting a brick-and-mortar establishment;

a change, between a first and a second time range, in how often users acquire instances of an item associated with an item identifier from an online source after visiting a brick-and-mortar establishment;

how often users acquire instances of an item associated with an item identifier from an online source, such as one of example online sources 154, after picking up an instance of an item associated with the item identifier in a brick-and-mortar establishment;

a change, between a first and a second time range, in how often users acquire instances of an item associated with an item identifier from an online source, such as one of example online sources 154, after picking up an instance of an item associated with the item identifier in a brick-and-mortar establishment;

how often users made comparisons between an instance of an item associated with a first item identifier and an instance of an item associated with a second item identifier;

which items users often compared to one another;

a change in how often users made comparisons between an instance of an item associated with a first item identifier and an instance of an item associated with a second item identifier between a first time period and a second time period;

an amount of users within an environment that have been within the environment or acquired an item from the environment within a threshold amount of time;

an amount of users within an environment that are new to the environment or have not visited or acquired an item from the environment within a threshold amount of time;

an amount of revenue from returning users;

an amount of revenue from new users within the environment;

a change in revenue from returning users between a first time range and a second time range;

a change in revenue from new users between a first time range and a second time range;

an amount of users that acquired an instance of an item associated with an item identifier that had received an advertisement associated with the item identifier within a threshold amount of time;

an amount of users that acquired an instance of an item associated with an item identifier that had not received an advertisement associated with the item identifier within a threshold amount of time;

a change, between a first time range and a second time range, between an amount of users that acquired an instance of an item associated with an item identifier that had received an advertisement associated with the item identifier within a threshold amount of time;

a change, between a first time range and a second time range, between an amount of users that acquired an instance of an item associated with an item identifier that had received an advertisement associated with the item identifier within a threshold amount of time;

an amount of users that acquired an instance of an item associated with an item identifier that had received a sample of the item within a threshold amount of time;

a change, between a first time range and a second time range, between an amount of users that acquired an instance of an item associated with an item identifier that had received a sample of the item within a threshold amount of time;

an amount of users that acquired an instance of an item associated with an item identifier that had not received a sample of the item within a threshold amount of time;

a change, between a first time range and a second time range, between an amount of users that acquired an instance of an item associated with an item identifier that had not received a sample of the item within a threshold amount of time; and/or any other similar or different metrics, or changes in the metrics between two or more time ranges.

After the metrics component 138 generates some or all of the metrics data 148, the GUI component 140 may generate GUI data 152 for presenting one or more GUIs to respective computing devices, such as the GUI 122 to the computing device 124. For example, the servers 118 may enable users associated with respective items and/or brands to create accounts with the servers 118 for viewing metrics data associated with the item(s) associated with these respective users. For example, a vendor that sells or otherwise manages a particular item or brand of items, may create an account with the servers 118 for requesting to view certain metrics data associated with this item(s) and/or brand. Upon receiving a request for metrics data associated with a particular item or brand, the GUI component 140 may generate the corresponding GUI data 152, which may include metrics associated with the item(s) and/or brand (e.g., a collection of items). In some instances, the GUI component 140 may also determine, based on a determination by the related-item component 136, one or more items that are related to the item(s) or brand, and may generate GUI data that includes metrics data associated with these item(s) and/or brands.

FIG. 1, for instance, illustrates, that the GUI component 140 may present the GUI 122 on the computing device 124. As illustrated, the GUI 122 indicates certain metrics associated with an item that is sold or otherwise managed by a user associated with the computing device 124, along with metrics data associated with (in this example) three items that the related-item component 136 has deemed to be competitors of the item.

In addition to listing the metrics data, the GUI 122 and other GUIs generated by the GUI component 140 may enable the user of the computing device 124 (and users of other computing devices) to view the metrics data according to different filters or lenses. For example, when viewing metrics data associated with a particular brand, the user may be able to request to instead view metrics data associated with a particular sub-brand or individual item identifier. In addition, or in the alternative, the GUI 122 may enable the user to view the metrics data according to one or more specified user criteria or other non-user-based criteria. For example, the user may be able to request to view metrics data associated with users that shop in the morning versus the evening, to view metrics data associated with new customers of the brand versus returning customers of the brand, and/or the like.

Thus, the architecture 100) enables users associated with items and/or brands to view metrics data associated with their items and/or brands and to view this data with reference to competitor items. In addition, the architecture enables the users to view the data through different lenses, such as on a brand-basis, an individual-item-basis, according to different customer segments, and/or the like. Further, given that the metrics data is based on real-world, physical interactions between users and items in the facility 104 (and, potentially, additional facilities), the metrics data may be deemed much more reliable than metrics data based on customer surveys or other data that may not accurately reflect the actions of the users in these facilities.

Figure 2A:
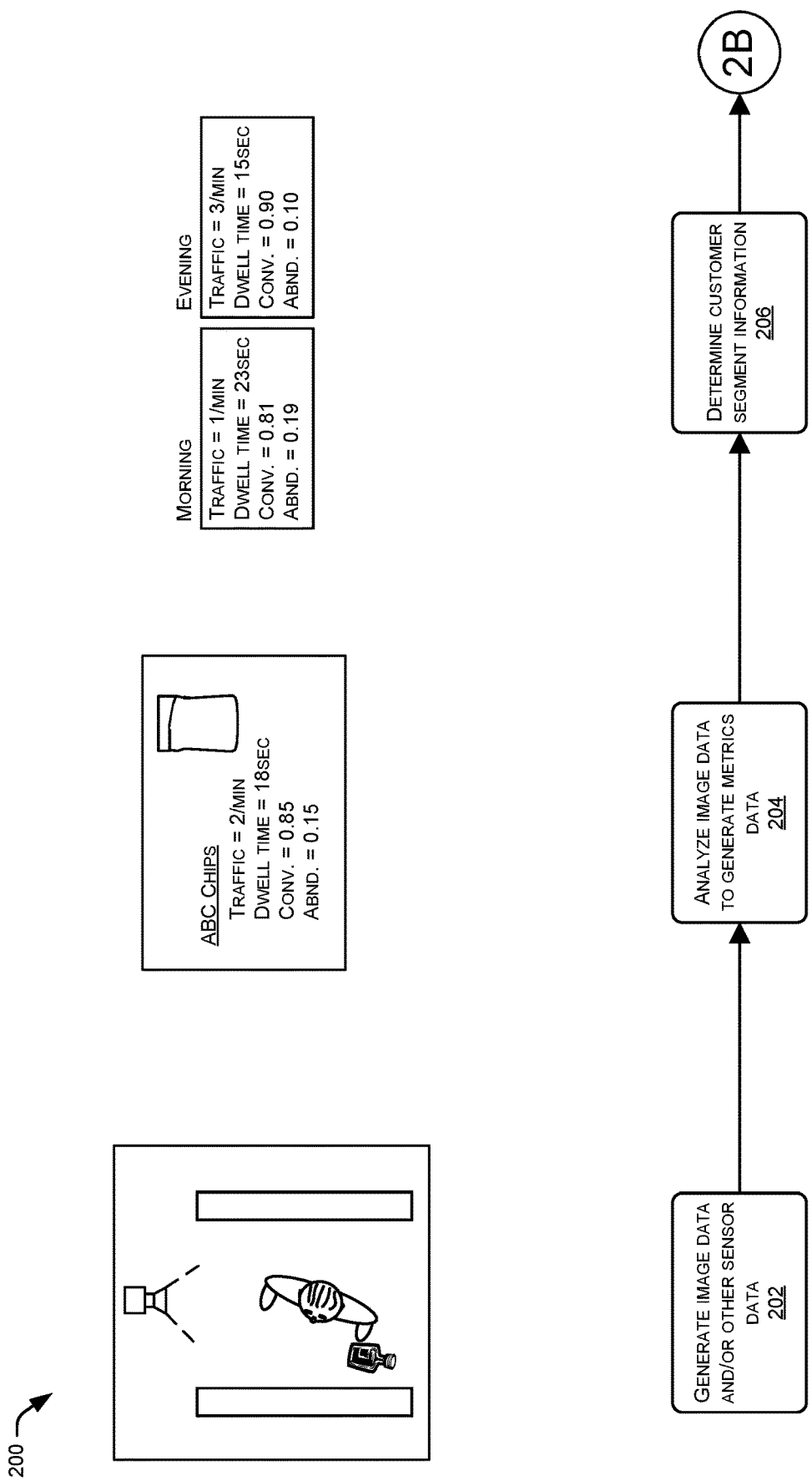
FIGS. 2A-B collectively illustrates an example sequence of operations in which one or more cameras in an environment generate image data, which is analyzed to generate metrics data associated with items in the environment. The sequence of operations also includes generating and presenting a GUI to enable a user associated with one or more of the items to view and interact with the metrics data.
Figure 2B:
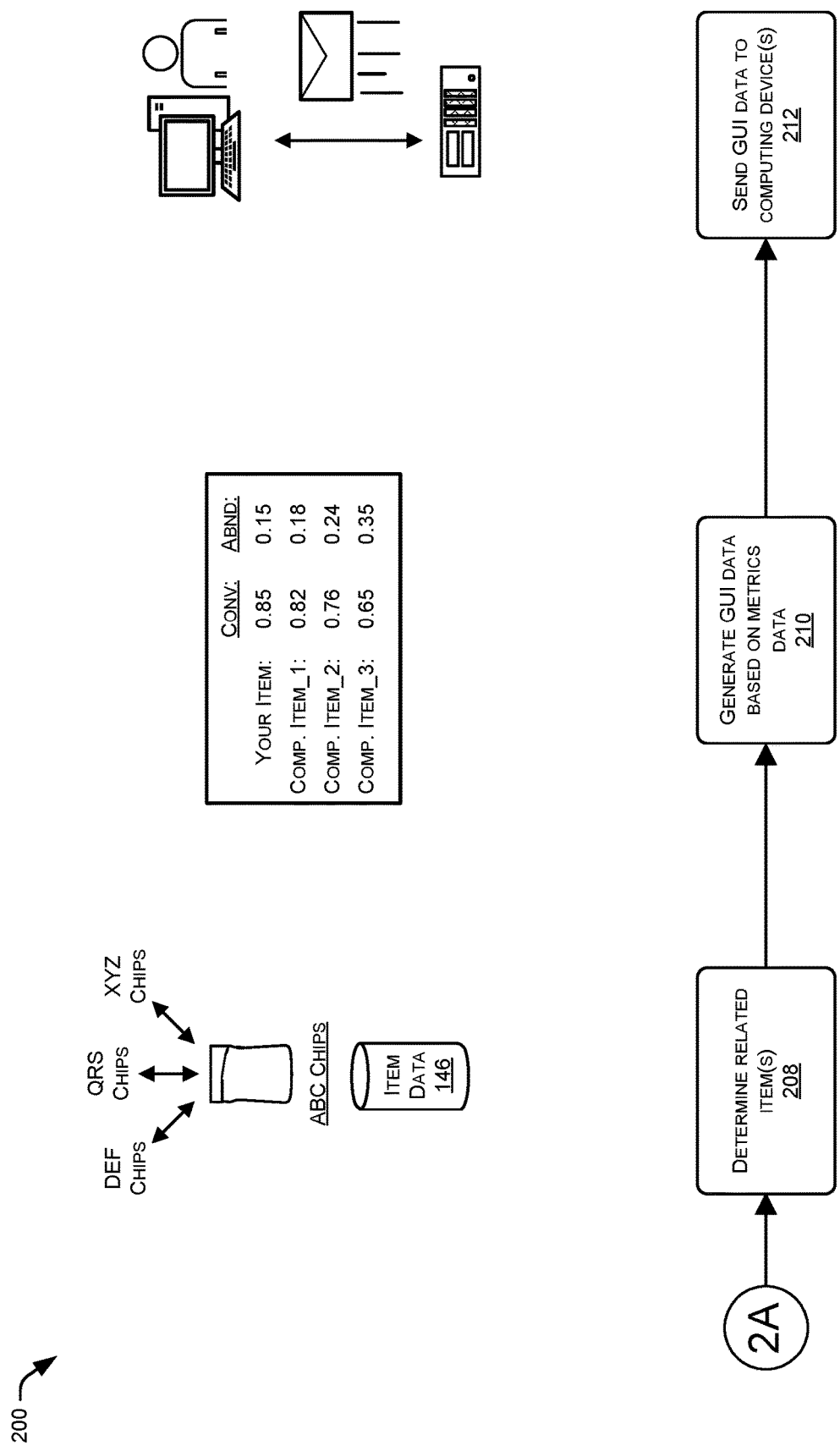

FIGS. 2A-B collectively illustrates an example sequence of operations 200 in which one or more cameras in an environment generate image data, which is analyzed to generate metrics data associated with items in the environment. The sequence of operations 200 also includes generating and presenting a GUI to enable a user associated with one or more of the items to view and interact with the metrics data.

An operation 202 represents generating image data and/or other sensor data in an environment, such as the facility 104 of FIG. 1. As noted above, the sensor data may include image data generated by one or more overhead or in-shelf cameras, weight data generated by one or more in-shelf or in-cart weight sensors, and/or the like.

An operation 204 represents analyze the image data to generate metrics data for a particular item identifier in this example. The metrics data may represent any sort of metric that is associated with interactions between users and items in the environment. In some instances, this operation may comprise using machine-learning and/or computer-vision algorithms to identify users passing by items in the environment, picking up and acquiring items, picking up and replacing items, picking up an item before acquiring a different item, and/or the like. In the illustrated example, the metrics data comprise an average amount of user traffic past a particular item (e.g., two users per minute), an average amount of time that users dwell in front of the item (e.g., 18 seconds), a conversion rate of the item indicating an amount of users that acquire an item after picking it up (e.g., 85%), and an abandoned rate of the item indicating an amount of users that do not acquire an item after picking it up (e.g., 15%). Of course, while a few examples are provided, the metrics data may comprise any similar or different metrics in other instances.

An operation 206 represents determine customer segment information. As noted above, this may include using one or more criteria to determine different segments or groups of customers. In the illustrated example, customers have been segmented according to when they shop, such as morning or evening. Further, FIG. 2 illustrates that the metrics data may be determined for these different customer segments.

FIG. 2B continues the illustration of the process and includes, at an operation 208, determining one or more items that are related to the item for which the metrics data was generated at the operation 204. This may include analyzing the item data 146 to determine which items have been deemed competitor items, which items are often purchased together, which items are often compared by users to one another, and so forth.

An operation 210 represents generating GUI data based on the metrics data for the item and the related items, while an operation 212 represents sending the GUI data to a computing device of a user associated with the item. In response to receiving the GUI, the user may be able to view the data according to different filters and/or lenses. For example, the user may request to view metrics data associated with a subset of customers, such as how new customer metrics compare to returning customer metrics. In addition, the user may be able to interact with the GUI to view different types of metrics, to view metrics according to a sub-brand or brand associated with the item, and/or the like.

FIG. 3 illustrates an example GUI 300 that the servers of FIG. 1 may generate and present on a computing device of a user, such as the example computing device 124 of FIG. 1. It is to be appreciated that while FIG. 1 illustrates an example GUI, other GUIs having other metrics and/or controls for viewing the metrics data may be used in other instances. Furthermore, while the techniques are described herein with reference to GUIs, it is to be appreciated that the metrics data may be presented to users in any other manner, such as via voice user interfaces (VUIs) or the like.

As illustrated, the GUI may present metrics data associated with multiple items. For instance, the GUI 300 here includes a first row that is associated with a first item, which may be the item offered or managed by the user of the computing device 124. In this example, this first item is offered by a vendor "Poppy Co" (indicated at row 302), having a brand name of "Starz" (indicated at row 304), an item number of "123878474" (indicated at row 306) and an item name of "Starz 16 oz." (indicated at row 308). In other words, the first row may indicate metrics data associated with the item "Starz 16 oz.", which is offered by vendor "Poppy Co". In some instances, this may be the item being managed by the user(s) associated with the computing device 124.

In addition, the GUI 300 here includes metrics data associated with five additional items, each of which may be related to the item "Starz 16 oz." For example, each of the five items in rows two through five may have been deemed competitor items to the first item. In some instances, the related-item component 136 may have identified these related items using the techniques described above, while in other instances a user operating the computing device 124 may have identified these items.

In either instance, the GUI 300 here includes metrics data associated with each of these items. For example, at a column 310, the GUI may indicate the number of times that each respective item was added to a cart of a user within the facility, potentially within a predefined amount of time. For example, the GUI 300 indicates that the first item was added to a user cart 89 times, the second item 138 times, and so forth.

At a column 312, the GUI 300 may indicate an abandonment rate associated with each respective item. This may indicate, for instance, a percentage of times that user did not add the respective item to their cart after picking up the item from the shelf. As illustrated, the first item is associated with an abandonment rate of 15%, the second item is associated with an abandonment rate of 9%, and so forth. A column 312, meanwhile, indicates a conversion rate associated with each respective item. This may indicate, for instance, a percentage of times that user added the respective item to their cart after picking up the item from the shelf. As illustrated, the first item is associated with a conversion rate of 85%, the second item is associated with a conversion rate of 91%, and so forth.

A subsequent column 316, meanwhile, represents an amount of times that users that purchased a particular item ended up repurchasing at least one instance of an item from an online source after having purchased at least one instance of the item from the facility 104 (or another facility). In this example, this was identified as having occurred three times for the first item, zero times for the second item, and so forth. A column 318 may indicate a number of times that a user considered a particular item (e.g., picked up) but ended up purchasing an instance of the item from an online source, such as one of the online sources 152, at a later time. For example, this information may indicate a number of users that were determined, from the image data, to have picked up an item and set it back down on the shelf, before acquiring the item from an online source.

Figure 4:
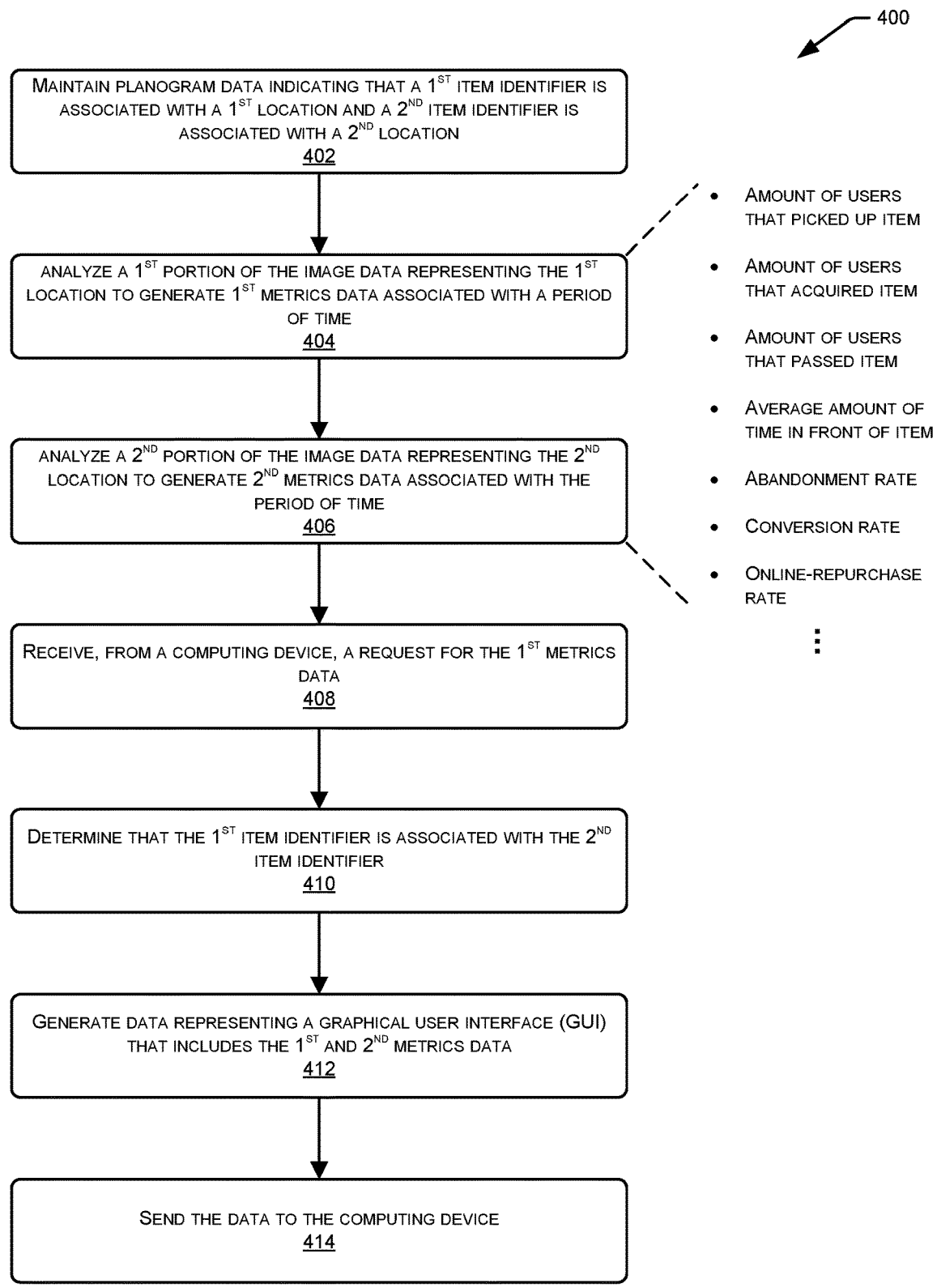
FIG. 4 illustrates a flow diagram of an example process for generating metrics data associated with at least two related items and generating GUI data for presenting the metrics data to one or more users.

FIG. 4 illustrates a flow diagram of an example process 400 for generating metrics data associated with at least two related items and generating GUI data for presenting the metrics data to one or more users. The process 400, and other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, these processes may be performed by one or more components of the servers 118, described above.

At 402, one or more components of the servers 118 may maintain planogram data, such as planogram data 148, indicating that a first item identifier is associated with a first location in the environment and a second item identifier is associated with a second location in the environment. In some instances, the planogram data may indicate coordinates within the environment are associated with each item offered in the environment. This information may be used to determine which items users are interacting with, acquiring, and the like.

At 404, the image-analysis component 130 may analyze a first portion of image data, generated by one or more cameras in the environment, representing the first location to generate first metrics data associated with a period of time. This first metrics data may indicate, in part, an amount of users that physically picked up an item associated with the first item identifier, an amount of users that acquired an item associated with the first item identifier, an amount of users that passed within a predefined distance of the first location during the period of time, an average amount of time that users spent in front of the first location during the period of time, an amount of users that physically picked up an item associated with the first item identifier without acquiring an item associated with the first item identifier, an amount of users that physically picked up an item associated with the first item identifier before acquiring an item associated with the second item identifier, an amount of users that physically picked up an item associated with the first item identifier before acquiring an item associated with the first item identifier from an online source, and/or the like.

At 406, the image-analysis component 130 may analyze a second portion of image data, generated by one or more cameras in the environment, representing the second location to generate second metrics data associated with a period of time. This second metrics data may indicate, in part, an amount of users that physically picked up an item associated with the second item identifier, an amount of users that acquired an item associated with the second item identifier, an amount of users that passed within a predefined distance of the second location during the period of time, an average amount of time that users spent in front of the second location during the period of time, an amount of users that physically picked up an item associated with the second item identifier without acquiring an item associated with the second item identifier, an amount of users that physically picked up an item associated with the second item identifier before acquiring an item associated with a different item identifier, an amount of users that physically picked up an item associated with the second item identifier before acquiring an item associated with the second item identifier from an online source, and/or the like.

At 408, the servers 118 may receive, from a computing device, a request for the first metrics data. For example, the servers 118 may receive the request from the computing device 124 described above with reference to FIG. 1.

At 410, the related-item component 134 may determine that the second the second item identifier is related to the first item identifier. As described above, the related-item component 136 may determine that the second item identifier is related to the first item identifier based on association stored in the item data 146, or a user may explicitly indicate the related item identifier.

At 412, the GUI component 138 may generate data representing a graphical user interface (GUI) that includes the first metrics data and the second metrics data. As described above, the metrics component 136 may have generated the first and second metrics data based on the user-item interactions determined by the image-analysis component 130. This metrics data may comprise any sort of metrics related to the first and second item identifiers, such as any of the metrics data described herein.

At 414, the GUI component 138 may send the GUI data to the computing device, such as the computing device 124. As described above, in some instances a user of the computing device 124 may interact with the GUI to view the data according to different lenses or filters. For example, the user may operate the GUI to view metrics data associated with one or more customer segments, to view metrics data associated with an entire brand or individual items, to view metrics data at individual facilities or across groups of facilities, and/or the like.

Figure 5:
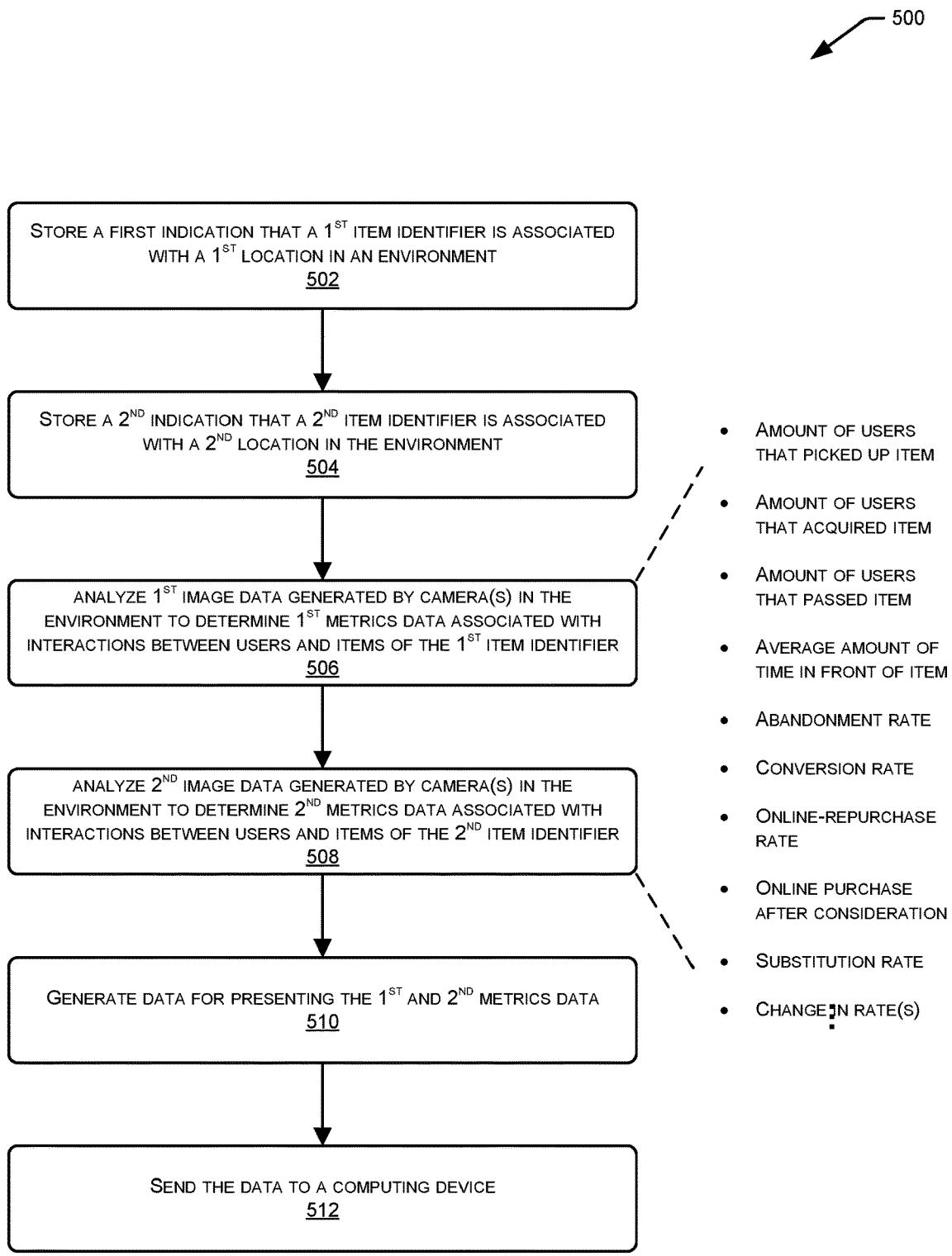
FIG. 5 illustrates a flow diagram of another example process for generating metrics data associated with at least two related items and generating data for presenting the metrics data to one or more users.

FIG. 5 illustrates a flow diagram of another example process 500 for generating metrics data associated with at least two related items and generating GUI data for presenting the metrics data to one or more users. In some instances, one or more components of the servers 118 may perform some or all of the illustrated operations.

At 502, the servers 118 may store a first indication that the first item identifier is associated with a first location in the environment. For instance, the servers 118 may determine that the first item identifier is associated with a first physical space within the environment and may store data indicating this association in the planogram data 150.

At 504, the servers 118 may similarly store a second indication that the second item identifier is associated with a second location in the environment. For instance, the servers 118 may determine that the second item identifier is associated with a second physical space within the environment and may store data indicating this association in the planogram data 150.

At 506, the image-analysis component 130 may analyze first image data generated by one or more cameras in an environment to determine first metrics data associated with interactions between users in the environment and instances of an item associated with a first item identifier. In some instances, the first metrics data may indicate an amount of users that passed within a predefined distance of the first location during a predefined period of time, an average amount of time that users spent within a predefined distance of the first location during a predefined period of time, a change between: (i) an average amount of time that users spent within a predefined distance of the first location during a first predefined period of time, and (ii) an average amount of time that users spent within the predefined distance of the first location during a second predefined period of time, an amount of users that physically picked up and acquired an instance of an item associated with the first item identifier, an amount of users that physically picked up but did not acquire an instance of an item associated with the first item identifier, a change between: (i) an amount of users that physically picked up but did not acquire an instance of an item associated with the first item identifier during a first predefined period of time, and (ii) an amount of users that physically picked up but did not acquire an instance of an item associated with the first item identifier during a second predefined period of time, an amount of users that acquired an instance of an item associated with an item identifier other than the first item identifier after physically picking up and setting down an instance of an item associated with the first item identifier, an amount of users that physically picked up an instance of an item associated with the first item identifier before acquiring an instance of an item associated with the first item identifier from an online source, and/or the like.

At 508, the image-analysis component 130 may analyze second image data generated by one or more cameras in an environment to determine second metrics data associated with interactions between users in the environment and instances of an item associated with a second item identifier. In some instances, the second metrics data may indicate an amount of users that passed within a predefined distance of the second location during a predefined period of time, an average amount of time that users spent within a predefined distance of the second location during a predefined period of time, a change between: (i) an average amount of time that users spent within a predefined distance of the second location during a first predefined period of time, and (ii) an average amount of time that users spent within the predefined distance of the second location during a second predefined period of time, an amount of users that physically picked up and acquired an instance of an item associated with the second item identifier, an amount of users that physically picked up but did not acquire an instance of an item associated with the second item identifier, a change between: (i) an amount of users that physically picked up but did not acquire an instance of an item associated with the second item identifier during a first predefined period of time, and (ii) an amount of users that physically picked up but did not acquire an instance of an item associated with the second item identifier during a second predefined period of time, an amount of users that acquired an instance of an item associated with an item identifier other than the second item identifier after physically picking up and setting down an instance of an item associated with the second item identifier, an amount of users that physically picked up an instance of an item associated with the second item identifier before acquiring an instance of an item associated with the second item identifier from an online source, and/or the like.

At 510, the GUI component 138 may generate data for presenting the first metrics data and the second metrics data. As described above, the metrics component 136 may have generated the first and second metrics data based on the user-item interactions determined by the image-analysis component 130.

At 512, the GUI component 138 may send the data to a computing device, such as the example computing device 124 described above. As described above, in some instances a user of the computing device 124 may interact with the data, such as a GUI or VUI, to view the data according to different lenses or filters. For example, the user may operate the data to view metrics data associated with one or more customer segments, to view metrics data associated with an entire brand or individual items, to view metrics data at individual facilities or across groups of facilities, and/or the like.

Figure 6A:
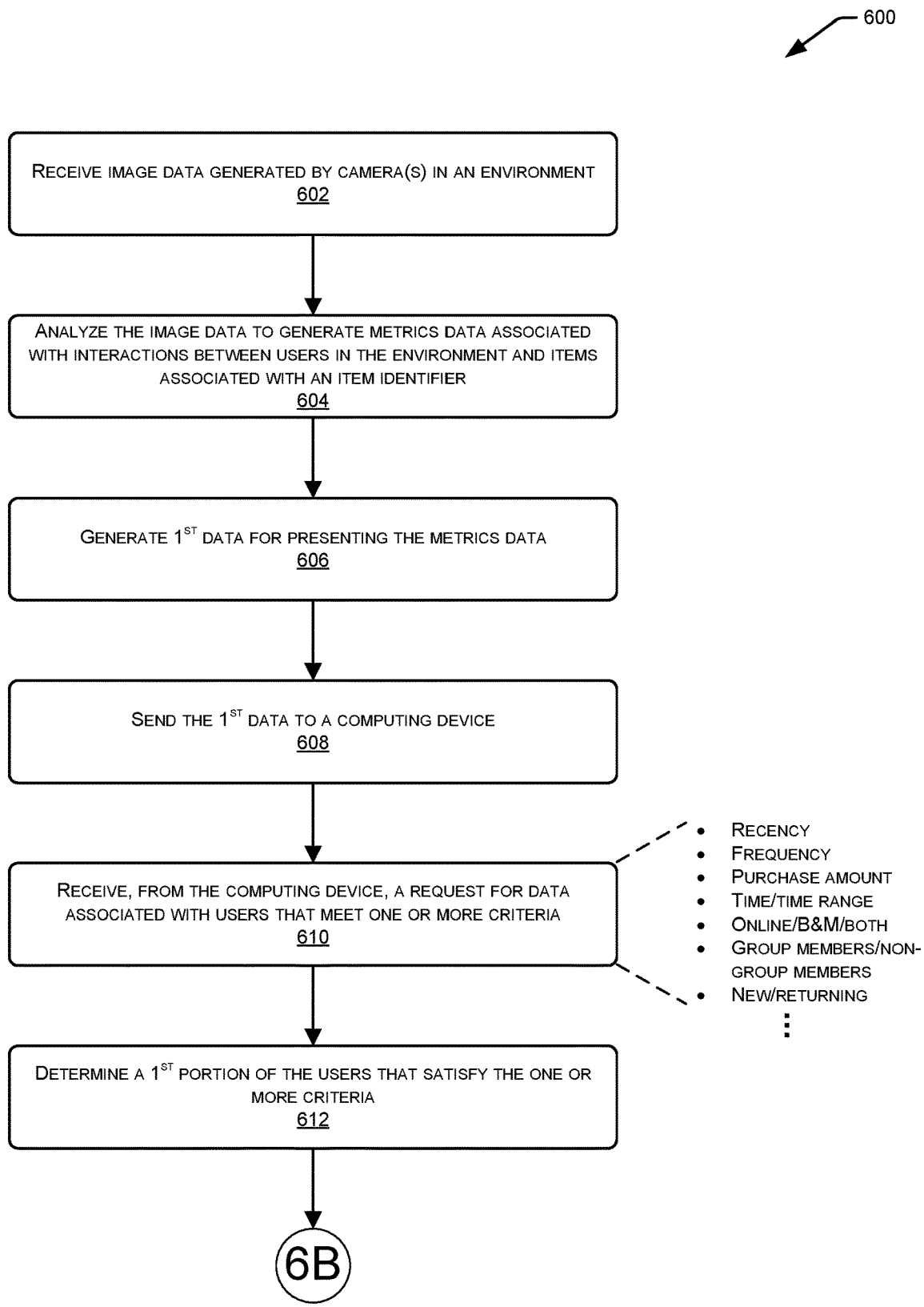
FIGS. 6A-B collectively illustrate a flow diagram of another example process for generating metrics data associated with interactions between users and one or more items, generating first data for presenting the metrics data, receiving a request to view metrics data associated with a subset of the users, and generating second data for presenting a corresponding subset of the metrics data.
Figure 6B:
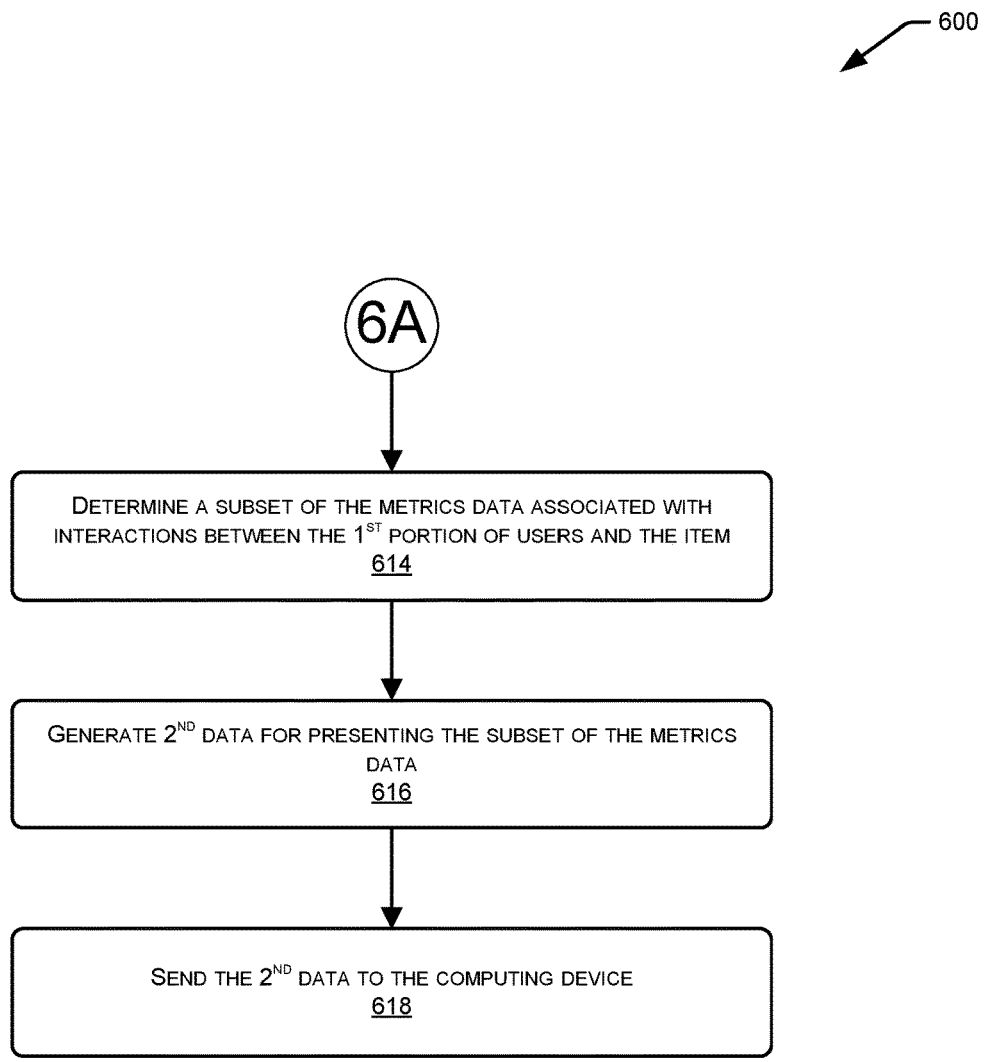

FIGS. 6A-B collectively illustrate a flow diagram of another example process 600 for generating metrics data associated with interactions between users and one or more items, generating first data for presenting the metrics data, receiving a request to view metrics data associated with a subset of the users, and generating second data for presenting a corresponding subset of the metrics data. In some instances, one or more components of the servers 118 may perform some or all of the illustrated operations.

At 602, the servers may receive image data generated by one or more cameras in an environment, such as image data received by the example cameras 112(1)-(2) described above.

At 604, the image-analysis component 130 may analyze the image data to determine metrics data associated with interactions between users in the environment and instances of an item associated with an item identifier. The metrics data may indicate an amount of users that passed within a predefined distance of a location associated with the item identifier during a predefined period of time, an average amount of time that users spent within a predefined distance of the location during a predefined period of time, a change between: (i) an average amount of time that users spent within a predefined distance of the location during a first predefined period of time, and (ii) an average amount of time that users spent within the predefined distance of the location during a second predefined period of time, an amount of users that physically picked up and acquired an instance of an item associated with the item identifier, an amount of users that physically picked up but did not acquire an instance of an item associated with the item identifier, a change between: (i) an amount of users that physically picked up but did not acquire an instance of an item associated with the item identifier during a first predefined period of time, and (ii) an amount of users that physically picked up but did not acquire an instance of an item associated with the item identifier during a second predefined period of time, an amount of users that acquired an instance of an item associated with an item identifier other than the item identifier after physically picking up and setting down an instance of an item associated with the item identifier, an amount of users that physically picked up an instance of an item associated with the item identifier before acquiring an instance of an item associated with the item identifier from an online source, and/or the like.

At 606, the GUI component 138 may generate first data for presenting the metrics data. At 608, the servers may send the first data to a computing device, such as the example computing device 124. As described above, in some instances a user of the computing device 124 may interact with the data to view the data according to different lenses or filters. For example, the user may operate the data to view metrics data associated with one or more customer segments, to view metrics data associated with an entire brand or individual items, to view metrics data at individual facilities or across groups of facilities, and/or the like.

At 610, the servers may receive, from the computing device, a request for data associated with users that satisfy one or more specified criteria. In some instances, the specified criteria relate to at least one of a frequency of item acquisition (such as users that acquire instances of an item associated with the item identifier according to a predefined frequency), a recency of item acquisition (such as users that have acquired an instance of an item associated with the item identifier within a threshold amount of time), or an amount of item acquisition (such as users that have previously acquired a threshold amount of instances of an item associated with the item identifier). In addition, or in the alternative, the specified criteria may relate to a time or a time range, such as a request for data associated with users that shopped during a certain time range, during a certain time of day (e.g., morning, afternoon, etc.), and/or the like. In other instances, or additionally, the specified criteria may relate to a predefined shopping channel, such as users that have acquired items from an online source and/or from a brick-and-mortar establishment within a threshold amount of time. In still other instances, or additionally, the specified criteria may relate to group membership, such as a request for data associated with users that are associated with, or are not associated with, a particular group.

At 612, the customer-segmentation component 132 may determine a first portion of the users that satisfy the one or more specified criteria. For instance, the customer-segmentation component 132 may analyze the user data 144 to determine which customers satisfy the criteria.

FIG. 6B continues the illustration of the process 600 and includes, at 614, the metrics component 136 determining a subset of the metrics data, the subset of the metrics data being associated with interactions between the first portion of the users and instances of an item associated with the item identifier.

At 616, the GUI component 138 may generate second data for presenting the subset of the metrics data. At 618, the GUI component 138 may send the second data to the computing device. As described above, in some instances a user of the computing device 124 may interact with the data to view the data according to different lenses or filters. For example, the user may operate the data to view metrics data associated with one or more customer segments, to view metrics data associated with an entire brand or individual items, to view metrics data at individual facilities or across groups of facilities, and/or the like.

Figure 7:
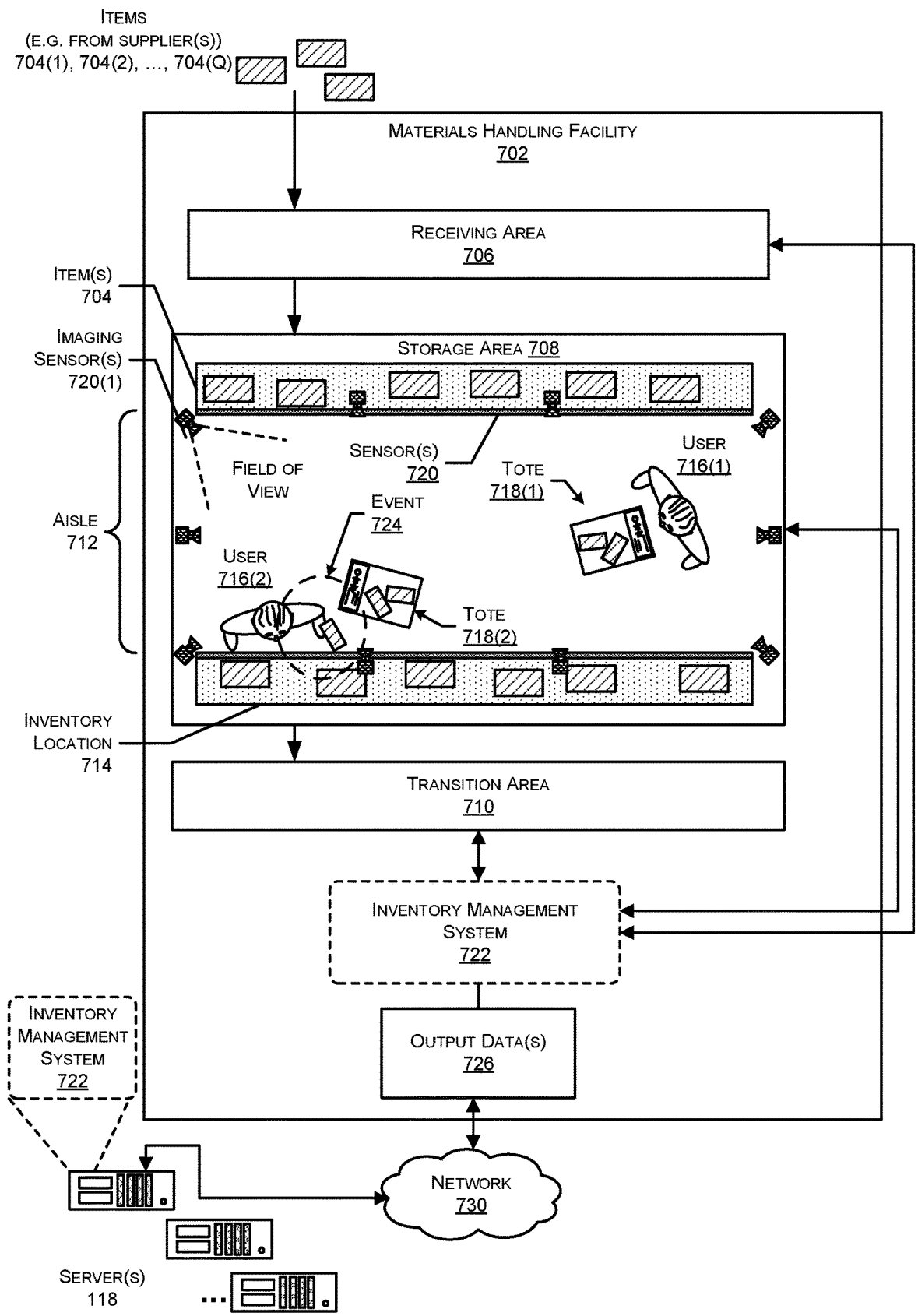
FIG. 7 is a block diagram of an example materials handling facility that includes sensors and an inventory management system configured to generate output regarding events occurring in the facility using the sensor data.

FIG. 7 is a block diagram of an example materials handling facility 702 that includes sensors and an inventory management system configured to generate output regarding events occurring in the facility using the sensor data. In some instances, the facility 702 corresponds to the architecture 100 and/or the facility 104 described above.

However, the following description is merely one illustrative example of an industry and environment in which the techniques described herein may be utilized. The materials handling facility 702 (or "facility") comprises one or more physical structures or areas within which one or more items 704(1), 704(2), . . . , 704(Q) (generally denoted as 704) may be held. As used in this disclosure, letters in parenthesis such as "(Q)" indicate an integer result. The items 704 comprise physical goods, such as books, pharmaceuticals, repair parts, electronic gear, groceries, and so forth.

The facility 702 may include one or more areas designated for different functions with regard to inventory handling. In this illustration, the facility 702 includes a receiving area 706, a storage area 708, and a transition area 710. The receiving area 706 may be configured to accept items 704, such as from suppliers, for intake into the facility 702. For example, the receiving area 706 may include a loading dock at which trucks or other freight conveyances unload the items 704.

The storage area 708 is configured to store the items 704. The storage area 708 may be arranged in various physical configurations. In one implementation, the storage area 708 may include one or more aisles 712. The aisle 712 may be configured with, or defined by, inventory locations 714 on one or both sides of the aisle 712. The inventory locations 714 may include one or more of shelves, racks, cases, cabinets, bins, floor locations, or other suitable storage mechanisms for holding or storing the items 704. The inventory locations 714 may be affixed to the floor or another portion of the facility's structure, or may be movable such that the arrangements of aisles 712 may be reconfigurable. In some implementations, the inventory locations 714 may be configured to move independently of an outside operator. For example, the inventory locations 714 may comprise a rack with a power source and a motor, operable by a computing device to allow the rack to move from one location within the facility 702 to another.

One or more users 716(1), 716(2), . . . , 716(U), totes 718(1), 718(2), . . . , 718(T) (generally denoted as 718) or other material handling apparatus may move within the facility 702. For example, the users 716 may move about within the facility 702 to pick or place the items 704 in various inventory locations 714, placing them on the totes 718 for ease of transport. An individual tote 718 is configured to carry or otherwise transport one or more items 704. For example, a tote 718 may include a basket, a cart, a bag, and so forth. In other implementations, other agencies such as robots, forklifts, cranes, aerial drones, and so forth, may move about the facility 702 picking, placing, or otherwise moving the items 704.

One or more sensors 720 may be configured to acquire information in the facility 702. The sensors 720 in the facility 702 may include sensors fixed in the environment (e.g., ceiling-mounted cameras) or otherwise, such as sensors in the possession of users (e.g., mobile phones, tablets, etc.). The sensors 720 may include, but are not limited to, cameras 720(1), weight sensors, radio frequency (RF) receivers, temperature sensors, humidity sensors, vibration sensors, and so forth. The sensors 720 may be stationary or mobile, relative to the facility 702. For example, the inventory locations 714 may contain cameras 720(1) configured to acquire images of pick or placement of items 704 on shelves, of the users 716(1) and 716(2) in the facility 702, and so forth. In another example, the floor of the facility 702 may include weight sensors configured to determine a weight of the users 716 or other object thereupon.

During operation of the facility 702, the sensors 720 may be configured to provide information suitable for tracking how objects move or other occurrences within the facility 702. For example, a series of images acquired by a camera 720(1) may indicate removal of an item 704 from a particular inventory location 714 by one of the users 716 and placement of the item 704 on or at least partially within one of the totes 718.

While the storage area 708 is depicted as having one or more aisles 712, inventory locations 714 storing the items 704, sensors 720, and so forth, it is understood that the receiving area 706, the transition area 710, or other areas of the facility 702 may be similarly equipped. Furthermore, the arrangement of the various areas within the facility 702 is depicted functionally rather than schematically. For example, multiple different receiving areas 706, storage areas 708, and transition areas 710 may be interspersed rather than segregated in the facility 702.

The facility 702 may include, or be coupled to, an inventory management system 722, which may perform some or all of the techniques described above with reference to the servers 118. As described below; the inventory management system 722 may include the components of the servers 118 illustrated in FIG. 1 and described above with reference to FIGS. 1-6B. For example, the inventory management system may maintain a virtual cart of each user within the facility. The inventory management system may also generate the metrics data described above present the metrics data on one or more generated GUIs.

As illustrated, the inventory management system 722 may reside at the facility 702 (e.g., as part of on-premises servers), on the servers 118 that are remote from the facility 702, a combination thereof. In each instance, the inventory management system 722 is configured to identify interactions and events with and between users 716, devices such as sensors 720, robots, material handling equipment, computing devices, and so forth, in one or more of the receiving area 706, the storage area 708, or the transition area 710. As described above, some interactions may further indicate the existence of one or more events 724—or predefined activities of interest. For example, events 724 may include the entry of the user 716 to the facility 702, stocking of items 704 at an inventory location 714, picking of an item 704 from an inventory location 714, returning of an item 704 to an inventory location 714, placement of an item 704 within a tote 718, movement of users 716 relative to one another, gestures by the users 716, and so forth. Other events 724 involving users 716 may include the user 716 providing authentication information in the facility 702, using a computing device at the facility 702 to authenticate identity to the inventory management system 722, and so forth. Some events 724 may involve one or more other objects within the facility 702. For example, the event 724 may comprise movement within the facility 702 of an inventory location 714, such as a counter mounted on wheels. Events 724 may involve one or more of the sensors 720. For example, a change in operation of a sensor 720, such as a sensor failure, change in alignment, and so forth, may be designated as an event 724. Continuing the example, movement of a camera 720(1) resulting in a change in the orientation of the field of view 728 (such as resulting from someone or something bumping the camera 720(1)) (e.g. camera 104) may be designated as an event 724.

By determining the occurrence of one or more of the events 724, the inventory management system 722 may generate output data 726. The output data 726 comprises information about the event 724. For example, where the event 724 comprises an item 704 being removed from an inventory location 714, the output data 726 may comprise an item identifier indicative of the particular item 704 that was removed from the inventory location 714 and a user identifier of a user that removed the item.

The inventory management system 722 may use one or more automated systems to generate the output data 726. For example, an artificial neural network, one or more classifiers, or other automated machine learning techniques may be used to process the sensor data from the one or more sensors 720 to generate output data 726. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 726 or the tentative results. The automated systems may generate confidence level data that provides information indicative of the accuracy or confidence that the output data 726 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 704, user 716, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 716 may pick an item 704(1) such as a perfume bottle that is generally cubical in shape from the inventory location 714. Other items 704 at nearby inventory locations 714 may be predominately spherical. Based on the difference in shape (cube vs. sphere) from the adjacent items, and the correspondence in shape with the previously stored image of the perfume bottle item 704(1) (cubical and cubical), the confidence level that the user 106 has picked up the perfume bottle item 704(1) is high.

In some situations, the automated techniques may be unable to generate output data 726 with a confidence level above a threshold result. For example, the automated techniques may be unable to distinguish which user 716 in a crowd of users 716 has picked up the item 704 from the inventory location 714. In other situations, it may be desirable to provide human confirmation of the event 724 or of the accuracy of the output data 726. For example, some items 704 may be deemed age restricted such that they are to be handled only by users 716 above a minimum age threshold.

In instances where human confirmation is desired, sensor data associated with an event 724 may be processed to generate inquiry data. The inquiry data may include a subset of the sensor data associated with the event 724. The inquiry data may also include one or more of one or more tentative results as determined by the automated techniques, or supplemental data. The subset of the sensor data may be determined using information about the one or more sensors 720. For example, camera data such as the location of the camera 720(1) within the facility 702, the orientation of the camera 720(1), and a field of view 728 of the camera 720(1) may be used to determine if a particular location within the facility 702 is within the field of view 728. The subset of the sensor data may include images that may show the inventory location 714 or that the item 704 was stowed. The subset of the sensor data may also omit images from other cameras 720(1) that did not have that inventory location 714 in the field of view 728. The field of view 728 may comprise a portion of the scene in the facility 702 that the sensor 720 is able to generate sensor data about.

Continuing the example, the subset of the sensor data may comprise a video clip acquired by one or more cameras 720(1) having a field of view 728 that includes the item 704. The tentative results may comprise the "best guess" as to which items 704 may have been involved in the event 724. For example, the tentative results may comprise results determined by the automated system that have a confidence level above a minimum threshold.

The facility 702 may be configured to receive different kinds of items 704 from various suppliers and to store them until a customer orders or retrieves one or more of the items 704. A general flow of items 704 through the facility 702 is indicated by the arrows of FIG. 7. Specifically, as illustrated in this example, items 704 may be received from one or more suppliers, such as manufacturers, distributors, wholesalers, and so forth, at the receiving area 706. In various implementations, the items 704 may include merchandise, commodities, perishables, or any suitable type of item 704, depending on the nature of the enterprise that operates the facility 702. The receiving of the items 704 may comprise one or more events 724 for which the inventory management system 722 may generate output data 726.

Upon being received from a supplier at receiving area 706, the items 704 may be prepared for storage. For example, items 704 may be unpacked or otherwise rearranged. The inventory management system 722 may include one or more software applications executing on a computer system to provide inventory management functions based on the events 724 associated with the unpacking or rearrangement. These inventory management functions may include maintaining information indicative of the type, quantity, condition, cost, location, weight, or any other suitable parameters with respect to the items 704. The items 704 may be stocked, managed, or dispensed in terms of countable, individual units or multiples, such as packages, cartons, crates, pallets, or other suitable aggregations. Alternatively, some items 704, such as bulk products, commodities, and so forth, may be stored in continuous or arbitrarily divisible amounts that may not be inherently organized into countable units. Such items 704 may be managed in terms of measurable quantity such as units of length, area, volume, weight, time, duration, or other dimensional properties characterized by units of measurement. Generally speaking, a quantity of an item 704 may refer to either a countable number of individual or aggregate units of an item 704 or a measurable amount of an item 704, as appropriate.

After arriving through the receiving area 706, items 704 may be stored within the storage area 708. In some implementations, like items 704 may be stored or displayed together in the inventory locations 714 such as in bins, on shelves, hanging from pegboards, and so forth. In this implementation, all items 704 of a given kind are stored in one inventory location 714. In other implementations, like items 704 may be stored in different inventory locations 714. For example, to optimize retrieval of certain items 704 having frequent turnover within a large physical facility 702, those items 704 may be stored in several different inventory locations 714 to reduce congestion that might occur at a single inventory location 714. Storage of the items 704 and their respective inventory locations 714 may comprise one or more events 724.

When a customer order specifying one or more items 704 is received, or as a user 716 progresses through the facility 702, the corresponding items 704 may be selected or "picked" from the inventory locations 714 containing those items 704. In various implementations, item picking may range from manual to completely automated picking. For example, in one implementation, a user 716 may have a list of items 704 they desire and may progress through the facility 702 picking items 704 from inventory locations 714 within the storage area 708, and placing those items 704 into a tote 718. In other implementations, employees of the facility 702 may pick items 704 using written or electronic pick lists derived from customer orders. These picked items 704 may be placed into the tote 718 as the employee progresses through the facility 702. Picking may comprise one or more events 724, such as the user 716 in moving to the inventory location 714, retrieval of the item 704 from the inventory location 714, and so forth.

After items 704 have been picked, they may be processed at a transition area 710. The transition area 710 may be any designated area within the facility 702 where items 704 are transitioned from one location to another or from one entity to another. For example, the transition area 710 may be a packing station within the facility 702. When the item 704 arrives at the transition area 710, the items 704 may be transitioned from the storage area 708 to the packing station. The transitioning may comprise one or more events 724. Information about the transition may be maintained by the inventory management system 722 using the output data 726 associated with those events 724.

In another example, if the items 704 are departing the facility 702 a list of the items 704 may be obtained and used by the inventory management system 722 to transition responsibility for, or custody of, the items 704 from the facility 702 to another entity. For example, a carrier may accept the items 704 for transport with that carrier accepting responsibility for the items 704 indicated in the list. In another example, a customer may purchase or rent the items 704 and remove the items 704 from the facility 702. The purchase or rental may comprise one or more events 724.

The inventory management system 722 may access or generate sensor data about the facility 702 and the contents therein including the items 704, the users 716, the totes 718, and so forth. The sensor data may be acquired by one or more of the sensors 720, data provided by other systems, and so forth. For example, the sensors 720 may include cameras 720(1) configured to acquire image data of scenes in the facility 702. The image data may comprise still images, video, or a combination thereof. The image data may be processed by the inventory management system 722 to determine a location of the user 716, the tote 718, the identity of the user 716, and so forth. As used herein, the identity of the user may represent a unique identifier of the user (e.g., name, number associated with user, username, etc.), an identifier that distinguishes the user amongst other users being located with the environment, or the like.

The inventory management system 722, or systems coupled thereto, may be configured to identify the user 716, as well as to determine other candidate users. In one implementation, this determination may comprise comparing sensor data with previously stored identity data. For example, the user 716 may be identified by showing their face to a facial recognition system, by presenting a token carrying authentication credentials, providing a fingerprint, scanning a barcode or other type of unique identifier upon entering the facility, and so forth. Identity of the user 716 may be determined before, during, or after entry to the facility 702. Determination of the user's 716 identity may comprise comparing sensor data associated with the user 716 in the facility 702 to previously stored user data.

In some instances, the inventory management system group users within the facility into respective sessions. That is, the inventory management system 722 may utilize the sensor data to determine groups of users that are effectively "together" (e.g., shopping together). In some instances, a particular session may include multiple users that entered the facility 702 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 718. Noting the child and the mother as belonging to the same session may increase the chances of successfully adding the box of cereal to the virtual shopping cart of the mother.

By determining the occurrence of one or more events 724 and the output data 726 associated therewith, the inventory management system 722 is able to provide one or more services to the users 716 of the facility 702. By utilizing one or more human associates to process inquiry data and generate response data that may then be used to produce output data 726, overall accuracy of the system may be enhanced. The enhanced accuracy may improve the user experience of the one or more users 716 of the facility 702. In some examples, the output data 726 may be transmitted over a network 730 to one or more servers 118.

Figure 8:
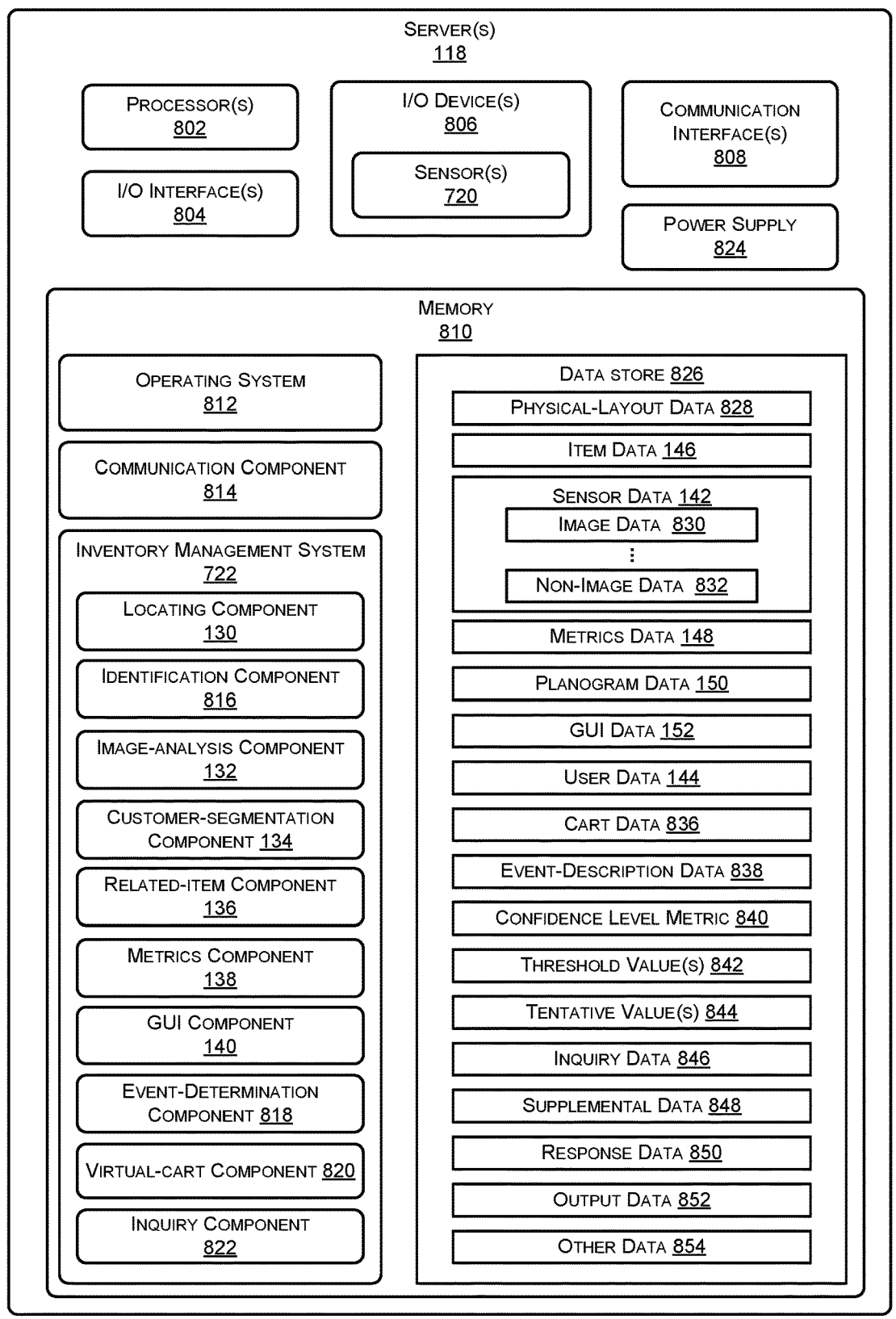
FIG. 8 illustrates a block diagram of one or more servers configured to support operation of the facility.

FIG. 8 illustrates a block diagram of one or more servers 118 configured to support operation of the facility. The servers 118 may be physically present at the facility 702, may be accessible by the network 730, or a combination of both. The servers 118 do not require end-user knowledge of the physical location and configuration of the system that delivers the services. Common expressions associated with the servers 118 may include "on-demand computing," "software as a service (Saas)," "cloud services," "data centers," and so forth. Services provided by the servers 118 may be distributed across one or more physical or virtual devices.

The servers 118 may include one or more hardware processors 802 (processors) configured to execute one or more stored instructions. The processors 802 may comprise one or more cores. The servers 118 may include one or more input/output (I/O) interface(s) 804 to allow the processor 802 or other portions of the servers 118 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth.

The servers 118 may also include one or more communication interfaces 808. The communication interfaces 808 are configured to provide communications between the servers 118 and other I/O devices 806, such as the sensors 720, the interface devices, routers, and so forth. The communication interfaces 808 may include devices configured to couple to personal area networks (PANs), wired and wireless local area networks (LANs), wired and wireless wide area networks (WANs), and so forth. For example, the communication interfaces 808 may include devices compatible with Ethernet, Wi-Fi™, and so forth. The servers 118 may also include one or more busses or other internal communications hardware or software that allow for the transfer of data between the various modules and components of the servers 118.

The servers 118 may also include a power supply 824. The power supply 824 is configured to provide electrical power suitable for operating the components in the servers 118.

The servers 118 may further include one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the servers 118. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interfaces 804, the communication interfaces 808, and provide various services to applications or components executing on the processors 802. The OS component 812 may implement a variant of the FreeBSD™ operating system as promulgated by the FreeBSD Project: other UNIX™ or UNIX-like variants: a variation of the Linux™ operating system as promulgated by Linus Torvalds: the Windows® Server operating system from Microsoft Corporation of Redmond, Washington, USA; and so forth.

One or more of the following components may also be stored in the memory 810. These components may be executed as foreground applications, background tasks, daemons, and so forth. A communication component 814 may be configured to establish communications with one or more of the sensors 720, one or more of the devices used by associates, other servers 118, or other devices. The communications may be authenticated, encrypted, and so forth.

The memory 810 may store the inventory management system 722. The inventory management system 722 is configured to provide some or all of the techniques described above with reference to FIGS. 1-6B. For example, the inventory management system 722 may include components to receive scan data, determine an event that happened with respect to the scanned item, update a virtual cart of a user, and so forth.

The inventory management system 722 may access information stored in one or more data stores 826 in the memory 810. The data store 826 may use a flat file, database, linked list, tree, executable code, script, or other data structure to store the information. In some implementations, the data store 826 or a portion of the data store 826 may be distributed across one or more other devices including other servers 118, network attached storage devices, and so forth. The data store 826 may include the datastores described above, such as the sensor data 142, the user data 144, the item data 146, the metrics data 148, the planogram data 150, and the GUI data 152.

The data store 826 may also include physical layout data 828. The physical layout data 828 provides a mapping of physical locations within the physical layout of devices and objects such as the sensors 720, item locations 114, and so forth. The physical layout data 828 may indicate the coordinates within the facility 702 of an inventory location 714, sensors 720 within view of that inventory location 714, and so forth. For example, the physical layout data 828 may include camera data comprising one or more of a location within the facility 702 of a camera 720(1), orientation of the camera 720(1), the operational status, and so forth. Continuing example, the physical layout data 828 may indicate the coordinates of the camera 720(1), pan and tilt information indicative of a direction that the field of view is oriented along, whether the camera 720(1) is operating or malfunctioning, and so forth.

In some implementations, the inventory management system 722 may access the physical layout data 828 to determine if a location associated with the event 724 is within the field of view of one or more sensors 720. Continuing the example above, given the location within the facility 702 of the event 724 and the camera data, the inventory management system 722 may determine the cameras 720(1) that may have generated images of the event 724.

The item data 146 comprises information associated with the items 704. The information may include information indicative of one or more inventory locations 714 at which one or more of the items 704 are stored. The item data 146 may also include order data, SKU or other product identifier, price, quantity on hand, weight, expiration date, images of the ITEM 704, detail description information, ratings, ranking, and so forth. The inventory management system 722 may store information associated with inventory management functions in the item data 146.

The data store 826 may also include sensor data 142. The sensor data 142 comprises information acquired from, or based on, the one or more sensors 720. For example, the sensor data 142 may comprise 3D information about an object in the facility 702. As described above, the sensors 720 may include a camera 720(1), which is configured to acquire one or more images. These images may be stored as the image data 830. The image data 830 may comprise information descriptive of a plurality of picture elements or pixels. Non-image data 832 may comprise information from other sensors 720, such as input from the microphones, weight sensors, and so forth.

User data 144 may also be stored in the data store 826. The user data 144 may include identity data, information indicative of a profile, purchase history, location data, images of the user 716, demographic data, and so forth. Individual users 716 or groups of users 716 may selectively provide user data 144 for use by the inventory management system 722. The individual users 716 or groups of users 716 may also authorize collection of the user data 144 during use of the facility 702 or access to user data 144 obtained from other systems. For example, the user 716 may opt-in to collection of the user data 144 to receive enhanced services while using the facility 702.

In some implementations, the user data 144 may include information designating a user 716 for special handling. For example, the user data 144 may indicate that a particular user 716 has been associated with an increased number of errors with respect to output data 726. The inventory management system 722 may be configured to use this information to apply additional scrutiny to the events 724 associated with this user 716. For example, events 724 that include an item 704 having a cost or result above the threshold amount may be provided to the associates for processing regardless of the determined level of confidence in the output data 726 as generated by the automated system.

The inventory management system 722 may include one or more of a locating component 130, an identification component 816, an image-analysis component 132, a customer-segmentation component 134, a related-item component 136, a metrics component 138, a GUI component 140, an event-determination component 818, a virtual-cart component 820, and an inquiry component 822, potentially amongst other components.

As discussed above, the locating component 130 functions to locate items or users within the environment of the facility to allow the inventory management system 722 to assign certain events to the correct users. That is, the locating component 130 may assign unique identifiers to users as they enter the facility and, with the users' consent, may locate the users throughout the facility 702 over the time they remain in the facility 702. The locating component 130 may perform this locating using sensor data 142, such as the image data 830. For example, the locating component 130 may receive the image data 830 and may use recognition techniques to identify users from the images. After identifying a particular user within the facility, the locating component 130 may then locate the user within the images as the user moves throughout the facility 702. Further, should the locating component 130 temporarily "lose" a particular user, the locating component 130 may again attempt to identify the users within the facility based on facial recognition, and/or using other techniques such as voice recognition, or the like.

Therefore, upon receiving the indication of the time and location of the event in question, the locating component 130 may query the data store 826 to determine which one or more users were at or within a threshold distance of the location of the event at the particular time of the event. Further, the locating component 130 may assign different confidence levels to different users, with the confidence levels indicating how likely it is that each corresponding user is the user that is in fact associated with the event of interest.

The locating component 130 may access the sensor data 142 in order to determine this location data of the user and/or items. The location data provides information indicative of a location of an object, such as the item 704, the user 716, the tote 718, and so forth. The location may be absolute with respect to the facility 702 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 702, 5.2 m from an inventory location 714 along a heading of 169°, and so forth. For example, the location data may indicate that the user 716(1) is 25.2 m along the aisle 712(1) and standing in front of the inventory location 714. In comparison, a relative location may indicate that the user 716(1) is 32 cm from the tote 718 at a heading of 73° with respect to the tote 118. The location data may include orientation information, such as which direction the user 716 is facing. The orientation may be determined by the relative direction the user's body is facing. In some implementations, the orientation may be relative to the interface device. Continuing the example, the location data may indicate that the user 716(1) is oriented with a heading of 0°, or looking north. In another example, the location data may indicate that the user 716 is facing towards the interface device.

The identification component 816 is configured to identify an object. In one implementation, the identification component 816 may be configured to identify an item 704. In another implementation, the identification component 816 may be configured to identify the user 716. For example, the identification component 816 may use recognition techniques to process the image data 830 and determine the identity data of the user 716 depicted in the images by comparing the characteristics in the image data 830 with previously stored results. The identification component 816 may also access data from other sensors 720, such as from an RFID reader, an RF receiver, fingerprint sensors, and so forth.

The event-determination component 818 is configured to process the sensor data 142 and generate output data 826, using the techniques described above and otherwise. The event-determination component 818 may access information stored in the data store 826 including, but not limited to, event description data 838, confidence levels 840, or threshold values 842. In some instances, the event-determination component 818 may be configured to create and utilize event classifiers for identifying events (e.g., predefined activity) within image data, potentially without use of other sensor data acquired by other sensors in the environment.

The event description data 838 comprises information indicative of one or more events 724. For example, the event description data 838 may comprise predefined profiles that designate movement of an item 704 from an inventory location 714 with the event 724 of "pick". The event description data 838 may be manually generated or automatically generated. The event description data 838 may include data indicative of triggers associated with events occurring in the facility 702. An event may be determined as occurring upon detection of the trigger. For example, sensor data 142 such as a change in weight from a weight sensor 720(6) at an inventory location 714 may trigger detection of an event of an item 704 being added or removed from the inventory location 714. In another example, the trigger may comprise an image of the user 716 reaching a hand toward the inventory location 714. In yet another example, the trigger may comprise two or more users 716 approaching to within a threshold distance of one another.

The event-determination component 818 may process the sensor data 142 using one or more techniques including, but not limited to, artificial neural networks, classifiers, decision trees, support vector machines, Bayesian networks, and so forth. For example, the event-determination component 818 may use a decision tree to determine occurrence of the "pick" event 724 based on sensor data 142. The event-determination component 818 may further use the sensor data 142 to determine one or more tentative results 844. The one or more tentative results 844 comprise data associated with the event 724. For example, where the event 724 comprises a disambiguation of users 716, the tentative results 844 may comprise a list of possible user 716 identities. In another example, where the event 724 comprises a disambiguation between items 104, the tentative results 844 may comprise a list of possible item identifiers. In some implementations, the tentative result 844 may indicate the possible action. For example, the action may comprise the user 716 picking, placing, moving an item 704, damaging an item 704, providing gestural input, and so forth.

In some implementations, the tentative results 844 may be generated by other components. For example, the tentative results 844 such as one or more possible identities or locations of the user 716 involved in the event 724 may be generated by the locating component 130. In another example, the tentative results 844 such as possible items 704 that may have been involved in the event 724 may be generated by the identification component 816.

The event-determination component 818 may be configured to provide a confidence level 840 associated with the determination of the tentative results 844. The confidence level 840 provides indicia as to the expected level of accuracy of the tentative result 844. For example, a low confidence level 840 may indicate that the tentative result 844 has a low probability of corresponding to the actual circumstances of the event 724. In comparison, a high confidence level 840 may indicate that the tentative result 844 has a high probability of corresponding to the actual circumstances of the event 724.

In some implementations, the tentative results 844 having confidence levels 840 that exceed the threshold may be deemed to be sufficiently accurate and thus may be used as the output data 726. For example, the event-determination component 818 may provide tentative results 844 indicative of the three possible items 704(1), 704(2), and 704(3) corresponding to the "pick" event 724. The confidence levels 840 associated with the possible items 704(1), 704(2), and 704(3) may be 25%, 70%, 92%, respectively. Continuing the example, the threshold result may be set such that confidence level 840 of 90% are deemed to be sufficiently accurate. As a result, the event-determination component 818 may designate the "pick" event 724 as involving a particular item. Upon the even-determination component 818 determining that a particular event occurred, such as a pick or a return, the virtual-cart component 820 may update virtual-cart data 836 associated with a corresponding user. For instance, if the event-determination component 818 determines that a particular user acquired one instance of a particular item, the virtual-cart component 820 may update the virtual-cart data 836 of that user to indicate the addition of the item.

The inquiry component 822 may be configured to use at least a portion of the sensor data 142 associated with the event 724 to generate inquiry data 846. In some implementations, the inquiry data 846 may include one or more of the tentative results 844 or supplemental data 848. The inquiry component 822 may be configured to provide inquiry data 846 to one or more devices associated with one or more human associates.

An associate user interface is presented on the respective devices of associates. The associate may generate response data 850 by selecting a particular tentative result 844, entering new information, indicating that they are unable to answer the inquiry, and so forth.

The supplemental data 848 comprises information associated with the event 724 or that may be useful in interpreting the sensor data 142. For example, the supplemental data 848 may comprise previously stored images of the items 704. In another example, the supplemental data 848 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data during presentation to an associate.

The inquiry component 822 processes the response data 850 provided by the one or more associates. The processing may include calculating one or more statistical results associated with the response data 850. For example, statistical results may include a count of the number of times associates selected a particular tentative result 844, determination of a percentage of the associates that selected a particular tentative result 844, and so forth. The inquiry component 822 is configured to generate the output data 726 based at least in part on the response data 850.

The inquiry component 822 may be configured to selectively distribute inquiries to particular associates. For example, some associates may be better suited to answering particular types of inquiries. Performance data, such as statistical data about the performance of the associates, may be determined by the inquiry component 822 from the response data 850 provided by the associates. For example, information indicative of a percentage of different inquiries in which the particular associate selected response data 850 that disagreed with the majority of associates may be maintained. In some implementations, test or practice inquiry data 846 having a previously known correct answer may be provided to the associate for training or quality assurance purposes. The determination of the set of associates to use may be based at least in part on the performance data.

By using the inquiry component 822, the event-determination component 818 may be able to provide high reliability output data 726 that accurately represents the event 724. The output data 726 generated by the inquiry component 822 from the response data 850 may also be used to further train the automated systems used by the inventory management system 722. For example, the sensor data 142 and the output data 726, based on response data 850, may be provided to one or more of the components of the inventory management system 722 for training in process improvement. Continuing the example, this information may be provided to an artificial neural network, Bayesian network, and so forth, to further train these systems such that the confidence level 840 and the tentative results 844 produced in the future for the same or similar input is improved. Finally, as FIG. 8 illustrates, the servers 118 may store and/or utilize other data 854.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

What is claimed is:

1. A system implemented in a retail store, comprising:
one or more cameras deployed within the retail store; and
a first computing device communicatively coupled with the one or more cameras, the first computing device comprising:
one or more processors; and
one or more computer-readable media storing computer-executable instructions that, when executed, cause the one or more processors to perform acts comprising:
analyzing first image data generated by the one or more cameras and planogram data comprising locations of items within the retail store to determine first events, the first events comprising customer pickups of instances of a first item at a first location in the retail store;
generating, based on the first events, first metrics data comprising a change between: (i) an average amount of time that customers spent within a predefined distance of the first location during a first predefined period of time, and (ii) an average amount of time that the customers spent within the predefined distance of the first location during a second predefined period of time;
analyzing second image data generated by the one or more cameras and the planogram data to determine second events, the second events comprising customer pickups of instances of a second item at a second location in the retail store;

generating, based on the second events, second metrics data comprising a change between: (i) an average amount of time that customers spent within the predefined distance of the second location during the first predefined period of time, and (ii) an average amount of time that the customers spent within the predefined distance of the second location during the second predefined period of time;

receiving, from a second computing device, a request for the first metrics data, wherein the request for the first metrics data does not include a request for the second metrics data;

determining that the second item is related to the first item based on item data, wherein the item data includes:
- at least one of an item ingredient, item advertising, item shape, or item size of the item associated with a first item identifier; and
- at least one of an item ingredient, item advertising, item shape, or item size of the item associated with a second item identifier;

generating, in response to determining that the second item is related to the first item, an output comprising the first metrics data and the second metrics data;

generating a graphical user interface (GUI) using the output and configured to allow a user to filter at least some of the output comprising the first metrics data and the second metrics data; and sending the GUI and the output comprising the first metrics data and the second metrics data to the second computing device in response to the request for the first metrics data.

2. The system as recited in claim 1, wherein the one or more computer-readable media further store computer-executable instructions that, when executed, cause the one or more processors to perform acts comprising:

receiving, from the second computing device, a request for data associated with users that satisfy one or more specified criteria;

determining a first portion of the users that satisfy the one or more specified criteria;

determining a subset of at least the first metrics data, the subset of the first metrics data being associated with interactions between the first portion of the users that satisfy the one or more specified criteria and instances of the item associated with the first item identifier; and sending the subset of at least the first metrics data to the second computing device.

3. The system as recited in claim 1, wherein;
at least the first metrics data further comprises a volume of user traffic within the predefined distance of the first location during a predefined period of time.

4. The system as recited in claim 1, wherein;
at least the first metrics data further comprises an average amount of time that users spent within the predefined distance of the first location during a predefined period of time.

5. The system as recited in claim 1, wherein generating the first metrics data based on the first events and generating the second metrics data based on the second events comprises using a decision tree to disambiguate between items based on tentative results.

6. The system as recited in claim 1, wherein;
at least the first metrics data further comprises an amount of users that physically picked up and acquired an instance of the item associated with the first item identifier.

7. The system as recited in claim 1, wherein;
at least the first metrics data further comprises an amount of users that physically picked up but did not acquire an instance of the item associated with the first item identifier.

8. The system as recited in claim 1, wherein at least the first metrics data further comprises a change between: (i) an amount of users that physically picked up but did not acquire an instance of the item associated with the first item identifier during the first predefined period of time, and (ii) an amount of users that physically picked up but did not acquire an instance of the item associated with the first item identifier during the second predefined period of time.

9. The system as recited in claim 1, wherein at least the first metrics data further comprises an amount of users that acquired an instance of an item associated with an item identifier other than the first item identifier after physically picking up and setting down an instance of the item associated with the first item identifier.

10. The system as recited in claim 1, wherein at least the first metrics data further comprises an amount of users that physically picked up an instance of the item associated with the first item identifier before acquiring an instance of the item associated with the first item identifier from an online source.

11. A method comprising:

analyzing first image data generated in a retail store and planogram data associated with the retail store to determine first events;

generating, based on the first events, first metrics data associated with interactions between users in the retail store and an instance of an item associated with a first item identifier and a first location in the retail store;

analyzing second image data in the retail store and the planogram data to determine second events;

generating, based on the second events, second metrics data associated with interactions between the users in the retail store and an instance of an item associated with a second item identifier and a second location in the retail store;

wherein at least one of the first metrics data or the second metrics data, respectively, comprises a change between: (i) an average amount of time that users spent within a predefined distance of the first location or the second location, respectively, during a first predefined period of time, and (ii) an average amount of time that users spent within the predefined distance of the first location or the second location, respectively, during a second predefined period of time;

receiving a request for the first metrics data, wherein the request for the first metrics data does not include a request for the second metrics data;

determining that the second item identifier is related to the first item identifier;

generating, in response to determining that the second item identifier is related to the first item identifier, an output comprising the first metrics data and the second metrics data;

generating a graphical user interface (GUI) using the output and configured to allow a user to filter at least some of the output comprising the first metrics data and the second metrics data; and sending the GUI and the output comprising the first metrics data and the second metrics data in response to the request for the first metrics data.

12. The method as recited in claim 11, further comprising:
receiving a request for data associated with users that satisfy one or more specified criteria;
determining a first portion of the users that satisfy the one or more specified criteria;
determining a subset of at least the first metrics data, the subset of the first metrics data being associated with interactions between the first portion of the users that satisfy one or more specified criteria and the instance of the item associated with the first item identifier; and
sending the subset of at least the first metrics data in response to the request for data associated with users that satisfy one or more specified criteria.

13. The method as recited in claim 11, wherein;
at least the first metrics data further comprises a volume of user traffic within the predefined distance of the first location during a predefined period of time.

14. The method as recited in claim 11, wherein;
at least the first metrics data further comprises an average amount of time that users spent within the predefined distance of the first location in the retail store during a predefined period of time.

15. The method as recited in claim 11, wherein;
determining that the second item identifier is related to the first item identifier comprises analyzing item data comprising an item ingredient of the item associated with the first item identifier and the item associated with the second item identifier.

16. A system comprising:
one or more processors; and
one or more computer-readable media storing computer-executable instructions that, when executed, cause the one or more processors to perform acts comprising:
analyzing first image data generated in a retail store and planogram data associated with the retail store to determine first events;
generating, based on the first events, first metrics data associated with interactions between users in the retail store and an instance of an item associated with a first item identifier, and a first location in the retail store;
analyzing second image data in the retail store and planogram data to determine second events;
generating, based on the second events, second metrics data associated with interactions between the users in the retail store and an instance of an item associated with a second item identifier and a second location in the retail store;
wherein at least one of the first metrics data or the second metrics data, respectively, comprises a change between: (i) an average amount of time that users spent within a predefined distance of the first location or the second location, respectively, during a first predefined period of time, and (ii) an average amount of time that users spent within the predefined distance of the first location or the second location, respectively, during a second predefined period of time;
receiving a request for the first metrics data, wherein the request for the first metrics data does not include a request for the second metrics data;
determining that the second item identifier is related to the first item identifier;
generating, in response to determining that the second item identifier is related to the first item identifier, an output comprising the first metrics data and the second metrics data;
generating a graphical user interface (GUI) using the output and configured to allow filtering of at least some of the output comprising the first metrics data and the second metrics data; and
sending the GUI and the output comprising the first metrics data and the second metrics data in response to the request for the first metrics data.

17. The system as recited in claim 16, wherein the one or more computer-readable media further store computer-executable instructions that, when executed, cause the one or more processors to perform an act comprising:
receiving a request for data associated with users that satisfy one or more specified criteria;
determining a first portion of the users that satisfy the one or more specified criteria;
determining a subset of at least the first metrics data, the subset of the first metrics data being associated with interactions between the first portion of the users that satisfy one or more specified criteria and the instance of the item associated with the first item identifier; and
sending the subset of at least the first metrics data in response to the request for data associated with users that satisfy one or more specified criteria.

18. The system as recited in claim 16, wherein;
at least the first metrics data further comprises a volume of user traffic within the predefined distance of the first location during a predefined period of time.

19. The system as recited in claim 16, wherein
at least the first metrics data further comprises an average amount of time that users spent within the predefined distance of the first location in the retail store during a predefined period of time.

20. The system as recited in claim 16, wherein determining that the second item identifier is related to the first item identifier comprises analyzing item data.

* * * * *